(12) United States Patent
Kaede

(10) Patent No.: US 11,867,929 B2
(45) Date of Patent: Jan. 9, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 685 days.

(21) Appl. No.: 15/930,873

(22) Filed: May 13, 2020

(65) Prior Publication Data
US 2021/0199987 A1 Jul. 1, 2021

(30) Foreign Application Priority Data
Dec. 25, 2019 (JP) .................. 2019-235304

(51) Int. Cl.
*G02B 30/56* (2020.01)
*G06F 3/01* (2006.01)

(52) U.S. Cl.
CPC .............. *G02B 30/56* (2020.01); *G06F 3/011* (2013.01); *G06F 3/016* (2013.01)

(58) Field of Classification Search
None
See application file for complete search history.

(56) References Cited

FOREIGN PATENT DOCUMENTS

| JP | 2015-035103 A | 2/2015 | | |
|---|---|---|---|---|
| JP | 2016-018351 A | 2/2016 | | |
| WO | WO-2017047527 A1 | * | 3/2017 | ............. A63B 22/02 |
| WO | 2017/125984 A1 | 7/2017 | | |

OTHER PUBLICATIONS

Jul. 25, 2023 Office Action issued in Japanese Patent Application No. 2019-235304.

* cited by examiner

*Primary Examiner* — Bao-Luan Q Le
*Assistant Examiner* — Danell L Owens
(74) *Attorney, Agent, or Firm* — Oliff PLC

(57) ABSTRACT

An information processing apparatus includes a processor. The processor is configured to generate data concerning a three-dimensional image to be formed in air and to associate a document with a specific position within the three-dimensional image, based on a characteristic of the document.

26 Claims, 26 Drawing Sheets

AERIAL IMAGE

AERIAL IMAGE

FIG. 15

| DOCUMENT | TOTAL NUMBER OF CHARACTERS | CONDITION #1 APPEARANCE TIMES OF "MULTIFUNCTION DEVICE" OR "PRINTER" | CONDITION #2 APPEARANCE TIMES OF "CONSUMABLES" OR "PARTS" | CONDITION #3 APPEARANCE TIMES OF "NOTIFICATION" | CONDITION #4 APPEARANCE TIMES OF "REPLACEMENT TIME" OR "LIFE" | RATIO | RATIO OF TOTAL NUMBER OF APPEARANCE TIMES TO TOTAL NUMBER OF CHARACTERS | OVERALL RELEVANCE DEGREE |
|---|---|---|---|---|---|---|---|---|
| DOCUMENT A | 10,000 | 30 | 10 | 5 | 20 | 6:2:1:4 | 0.0065 | 4.5 |
| DOCUMENT B | 20,000 | 10 | 40 | 80 | 60 | 1:4:8:6 | 0.0095 | 5 |
| DOCUMENT C | 30,000 | 6 | 6 | 30 | 3 | 2:2:10:1 | 0.0015 | 1 |
| ... | ... | ... | ... | ... | ... | ... | ... | ... |

FIG. 17

| DOCUMENT | TOTAL NUMBER OF CHARACTERS | CONDITION #1 "MULTIFUNCTION DEVICE" OR "PRINTER" | | CONDITION #2 "CONSUMABLES" OR "PARTS" | | CONDITION #3 "NOTIFICATION" | | ALL KEYWORDS | |
|---|---|---|---|---|---|---|---|---|---|
| | | NUMBER OF APPEARANCE TIMES | RATIO OF NUMBER OF APPEARANCE TIMES TO TOTAL NUMBER OF CHARACTERS | NUMBER OF APPEARANCE TIMES | RATIO OF NUMBER OF APPEARANCE TIMES TO TOTAL NUMBER OF CHARACTERS | NUMBER OF APPEARANCE TIMES | RATIO OF NUMBER OF APPEARANCE TIMES TO TOTAL NUMBER OF CHARACTERS | NUMBER OF APPEARANCE TIMES | RATIO OF TOTAL NUMBER OF APPEARANCE TIMES TO TOTAL NUMBER OF CHARACTERS |
| DOCUMENT A | 10,000 | 30 | 0.003 | 10 | 0.001 | 5 | 0.0005 | 45 | 0.0045 |
| DOCUMENT B | 20,000 | 10 | 0.0005 | 40 | 0.002 | 80 | 0.004 | 130 | 0.0065 |
| DOCUMENT C | 30,000 | 6 | 0.0002 | 6 | 0.0002 | 30 | 0.001 | 42 | 0.0014 |
| ... | ... | ... | ... | ... | ... | ... | ... | ... | ... |

FIG. 23
AERIAL IMAGE
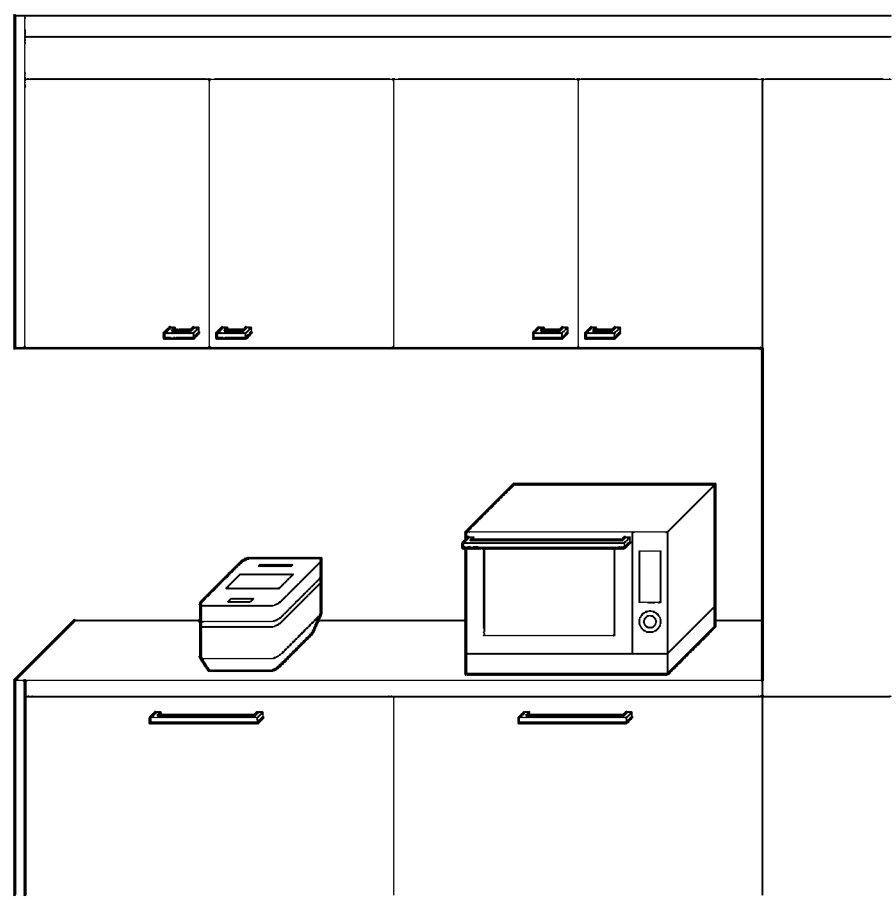
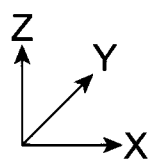

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-235304 filed Dec. 25, 2019.

BACKGROUND

(i) Technical Field

The present disclosure relates to an information processing apparatus and a non-transitory computer readable medium.

(ii) Related Art

Technologies of forming an image in the air are being proposed, and some of them are already applied to the use of an image formed in the air as an input interface. An example of the related art is disclosed in International Publication No. 2017/125984.

SUMMARY

Operations for an image formed in the air used as an input interface can be performed similarly to those for an interface displayed on a physical display.

Aspects of non-limiting embodiments of the present disclosure relate to making it possible to present various items of information to a user by using an aerial image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor. The processor is configured to generate data of a three-dimensional image to be formed in air and to associate a document with a specific position within the three-dimensional image, based on a characteristic of the document.

BRIEF DESCRIPTION OF THE DRAWINGS

Exemplary embodiments of the present disclosure will be described in detail based on the following figures, wherein:

FIG. 15 illustrates an example of a data table indicating information concerning documents that satisfy all four search conditions;

FIG. 17 illustrates another example of a data table indicating information concerning documents that satisfy all three search conditions;

FIG. 23 illustrates an example in which an aerial image is utilized in the architectural field or in the housing industry;

DETAILED DESCRIPTION

Exemplary embodiments of the disclosure will be described below with reference to the accompanying drawings.

First Exemplary Embodiment (System Configuration)

Figure 1:
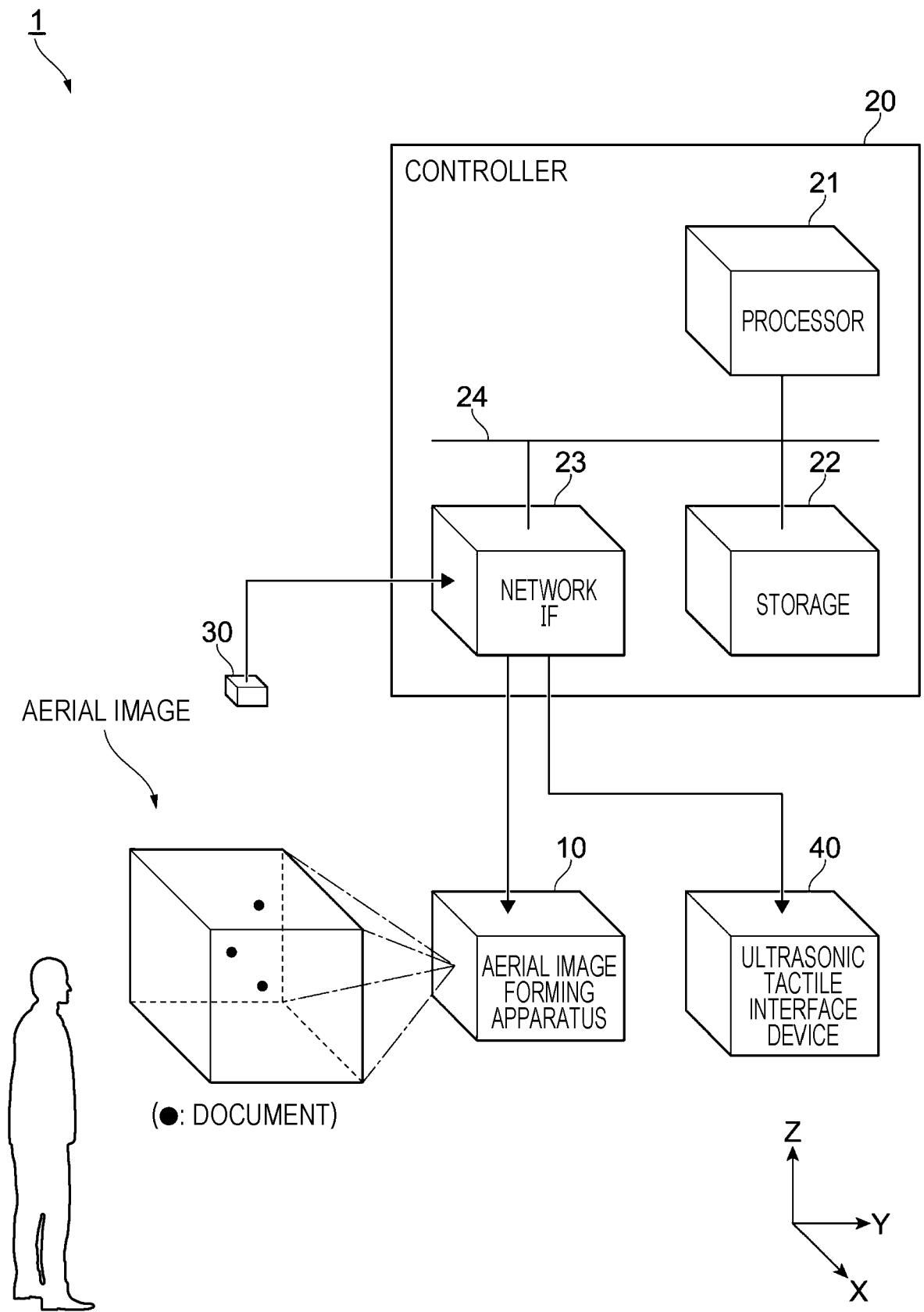
FIG. 1 illustrates an example of the configuration of an information processing system according to a first exemplary embodiment.

FIG. 1 illustrates an example of the configuration of an information processing system 1 according to a first exemplary embodiment.

The information processing system 1 includes an aerial image forming apparatus 10, a controller 20, a sensor 30, and an ultrasonic tactile interface device 40. The aerial image forming apparatus 10 forms a see-through image (hereinafter will also be called an aerial image). The controller 20 controls the aerial image forming apparatus 10 and other devices. The sensor 30 detects an operation performed on an aerial image with a finger, a pointing stick, a writing instrument, or any other objects. The ultrasonic tactile interface device 40 provides tactile stimulation to an object, such as a fingertip, used for giving an instruction.

In the first exemplary embodiment, not the entirety of an object, but a specific portion of the object, is used for performing an operation on an aerial image. For example, a fingertip or the tip of a pointing stick or a writing instrument is used for performing an operation.

A description will be given below, assuming that the tip of an object is detected. A palm may also be used for performing an operation, in which case, the entirety of a palm is detected.

An aerial image is formed as if it were floating in the air, so that an object can pass through the aerial image.

In the first exemplary embodiment, an aerial image is neither an image projected on a screen disposed in a real space nor is it an afterimage appearing due to the fast movement of a light-emitting element array in a real space.

An aerial image may be an image, characters, or a combination thereof. Other subjects may be used as an aerial image. An aerial image is not restricted to a particular size or a particular shape. An aerial image may be a linear image, a two-dimensional image, or a three-dimensional image. Examples of the shape of a two-dimensional aerial image are a triangle, a quadrilateral, other polygons, a circle, and more complicated shapes (such as stars, hearts, and human/object/animal silhouettes). Examples of a three-dimensional aerial image are a sphere, a cylinder, a cone, a cube, a triangular pyramid, a pyramid, a prism, a regular polyhedron, a combination thereof, and more complicated three-dimensional shapes, such as a human body, a vehicle, and a room.

In the example in FIG. 1, a cube is assumed as the initial shape of an aerial image.

An aerial image formed in the air is not limited to an image which defines cubic surfaces, but may be an image which defines cubic surfaces and also an image inside the cubic surfaces. In other words, an aerial image may be an image represented by voxels. An aerial image may not be limited to an image which defines the entirety of a cube or a plane, but may be a partial image thereof.

In the first exemplary embodiment, an aerial image is used as a guide for a user to provide an instruction for executing processing by moving an object in the air in which the aerial image is formed. An aerial image is not restricted to a still image, but may be a video image.

The aerial image forming apparatus 10 directly forms an aerial image in the air. As the approach to directly forming an aerial image #1 in the air, various methods have already been proposed, and some of them have been put to practical use. For example, a semi-transparent mirror, a beam splitter, a micromirror array, a microlens array, parallax barrier technologies, and plasma emission may be used to form an aerial image. The aerial image forming apparatus 10 may form an aerial image by using any of the above-described methods including the ones that will be developed in the future.

Data which defines an aerial image to be formed in the air by the aerial image forming apparatus 10 (such data will be called aerial image data) is generated by the controller 20. Aerial image data is an example of data concerning a three-dimensional image.

In the example in FIG. 1, three spherical icons are presented in the aerial image. Each icon is associated with one or plural documents. The sizes of the icons may not be necessarily uniform. An icon associated with a larger number of documents may be larger than an icon associated with a smaller number of documents. For example, the size of each icon may be determined according to the number of documents associated with the icon. The size of the icon may increase as the number of documents associated with the icon increases and the size of the icon may decrease as the number of documents associated with the icon decreases.

In FIG. 1, the icons each indicate a position to which one or more documents are associated. However, it is also possible to present no icon at a position to which one or more documents are associated.

The controller 20 includes a processor 21, a storage 22, a network interface (IF) 23, and a signal line 24, such as a bus or another type of signal line. As a result of executing a program, the processor 21 generates aerial image data, conducts a search, and executes another processing. The storage 22 stores programs and various items of data. The network IF 23 communicates with external devices. The signal line 24 connects the processor 21, the storage 22, and the network IF 23 with each other. The controller 20 may be a computer or a server on the Internet. The controller 20 is an example of an information processing apparatus.

The processor 21 is constituted by a central processing unit (CPU), for example. The storage 22 is constituted by a read only memory (ROM) storing a basic input output system (BIOS), a random access memory (RAM) used as a work area, and a hard disk drive which stores basic programs and application programs, for example.

The ROM and the RAM may be included in the processor 21. The processor 21 and the storage 22 form a computer.

The sensor 30 detects the position of an object, such as a hand, a finger, a pen, or an electronic device, in a space in which an aerial image is formed. The sensor 30 may detect a specific part of an object instead of the entirety thereof. In one example, the sensor 30 may detect the position of a palm. In another example, the sensor 30 may detect the position of a fingertip or the tip of a pen-type device. In another example, the sensor 30 may detect the position of a specific component embedded in a pen-type device or a device attached to a fingertip. In the following description, it is assumed that the sensor 30 detects the position of a fingertip.

As the sensor 30, an infrared sensor or an image sensor is used. The sensor 30 detects the position of a fingertip within a range of several millimeters to about one centimeter.

The ultrasonic tactile interface device 40 is constituted by an ultrasonic transducer array including ultrasonic transducers arranged in a lattice-like shape. In the first exemplary embodiment, the ultrasonic tactile interface device 40 generates ultrasonic waves to focus on a specific region of an aerial image. The ultrasonic transducer array may be operated only when the sensor 30 has detected an operation performed on a specific region with a fingertip.

When the ultrasonic transducer array is operated, pressure called acoustic radiation pressure is generated at a specific region. When a fingertip is placed at a position at which acoustic radiation pressure is generated, tactile stimulation is generated to make a user feel as if the surface of the fingertip were being pressed.

In the first exemplary embodiment, tactile stimulation is used as feedback to a user to indicate that a user's operation is received, and may also be used to represent the number or the density of documents associated with specific coordinates or a specific region in a space.

For example, a weak level of tactile stimulation may be generated at a position associated with fewer documents or the lower density of documents, while a strong level of tactile stimulation may be generated at a position associated with more documents or the higher density of documents. Given with such different levels of tactile stimulation, a user can understand whether documents are many or few in terms of what kind of a combination of characteristics of documents.

Instead of acoustic radiation pressure generated by the ultrasonic transducer array, air pressure may be used to provide tactile stimulation.

Figure 2:
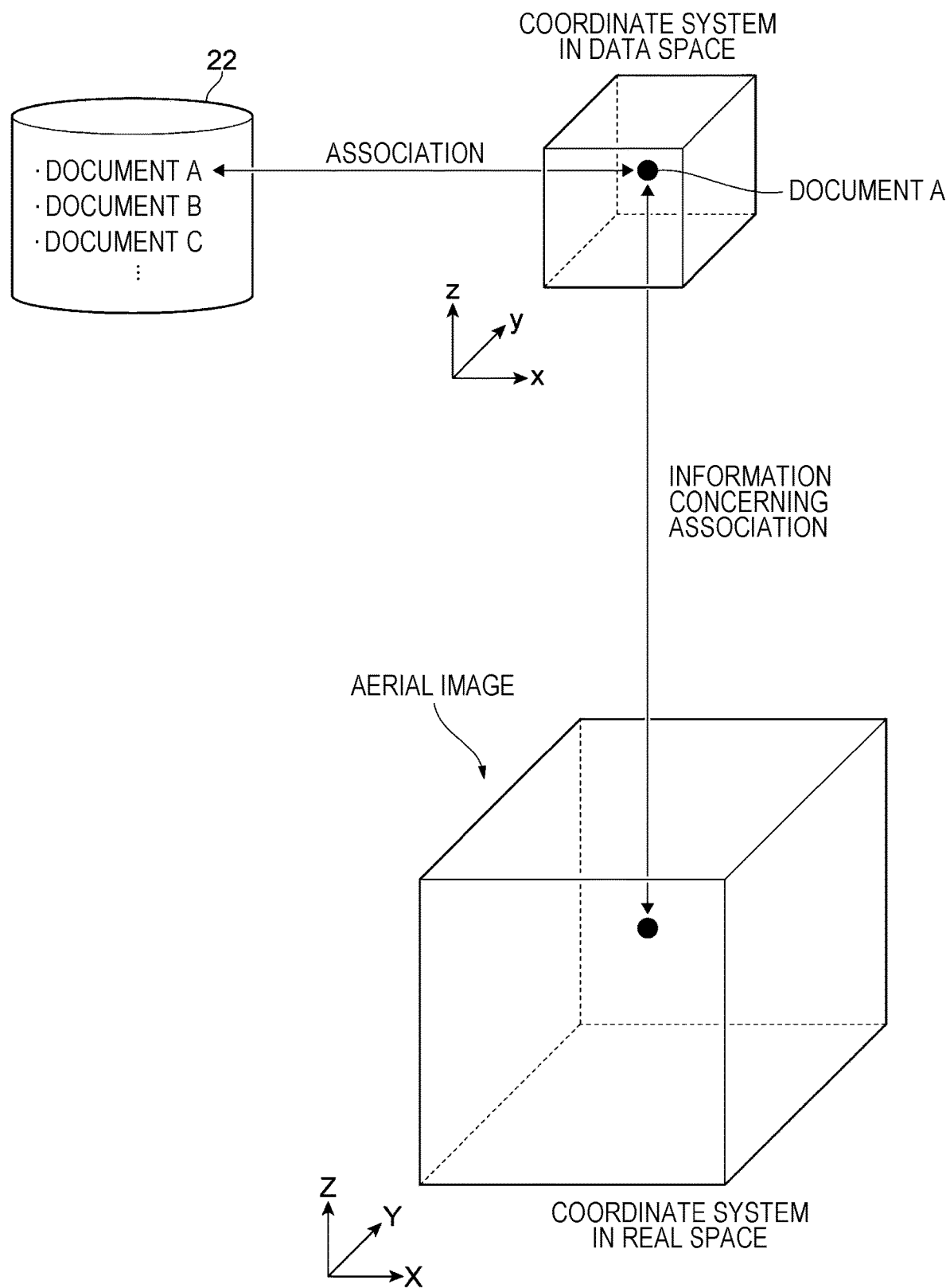
FIG. 2 illustrates a relationship among a document, a specific position in an aerial image, and a specific position in a real space.

FIG. 2 illustrates a relationship between a document, a specific position in an aerial image, and a specific position in a real space. In the example in FIG. 2, document A, document B, and document C are stored in the storage 22.

The storage formats of documents are not limited to specific formats, and various formats, such as WORD, JPEG, PDF, MOV, and HTML, may be used. Information in individual fields of a database concerning data, such as measurement data and statistical data, is also an example of documents. In the first exemplary embodiment, examples of documents are text, tables, images, video images, sound, and a combination thereof. Images include, not only still images, but also video images. Web screens are also an example of images.

In the first exemplary embodiment, a document is associated with a specific position within an aerial image, based on characteristics of the document. The characteristics of a document are determined by the attributes of the document, tag information appended to the document, and the analyzed content of the document, for example. The characteristics of a document vary in accordance with the content or type of document.

In the first exemplary embodiment, the coordinate system in a data space in which documents are mapped is defined by the three axes, that is, the x, y, and z axes. A position may be larger than a dot and may be represented by ranges of coordinates on the x, y, and z axes. Information concerning a characteristic of documents is allocated to each axis. However, it is not necessary that all the axes are appended with information concerning the characteristics of documents. For example, information concerning the characteristics of documents may be allocated to two of the three axes, and information irrelevant to the characteristics of the documents may be allocated to the remaining axis.

A conversion rule or a conversion table may be used to associate the characteristics of documents with information allocated to the coordinate axes defining a data space. In this case, the characteristics of the documents may be converted into information allocated to the individual coordinate axes defining a data space. Then, each document may be mapped onto the data space by using the converted information.

In the first exemplary embodiment, the processor 21 of the controller 20 (see FIG. 1) obtains information on the coordinates at which an aerial image is formed in a real space (information indicating where the aerial image is formed in the real space) from the aerial image forming apparatus 10 (see FIG. 1). In the first exemplary embodiment, a position in the real space is represented by coordinates on the x, y, and z axes. The processor 21 may obtain information on the coordinates at which the aerial image is formed in the real space as information concerning a space monitored by the sensor 30 (see FIG. 1).

In the first exemplary embodiment, the above-described relationship between a document and a specific position within an aerial image is stored in the storage 22. The processor 21 is thus able to identify a specific position (x, y, and z coordinates) in the real space that corresponds to the document from the specific position (x, y, and z coordinates) in the aerial image that is associated with the document.

Figure 3:
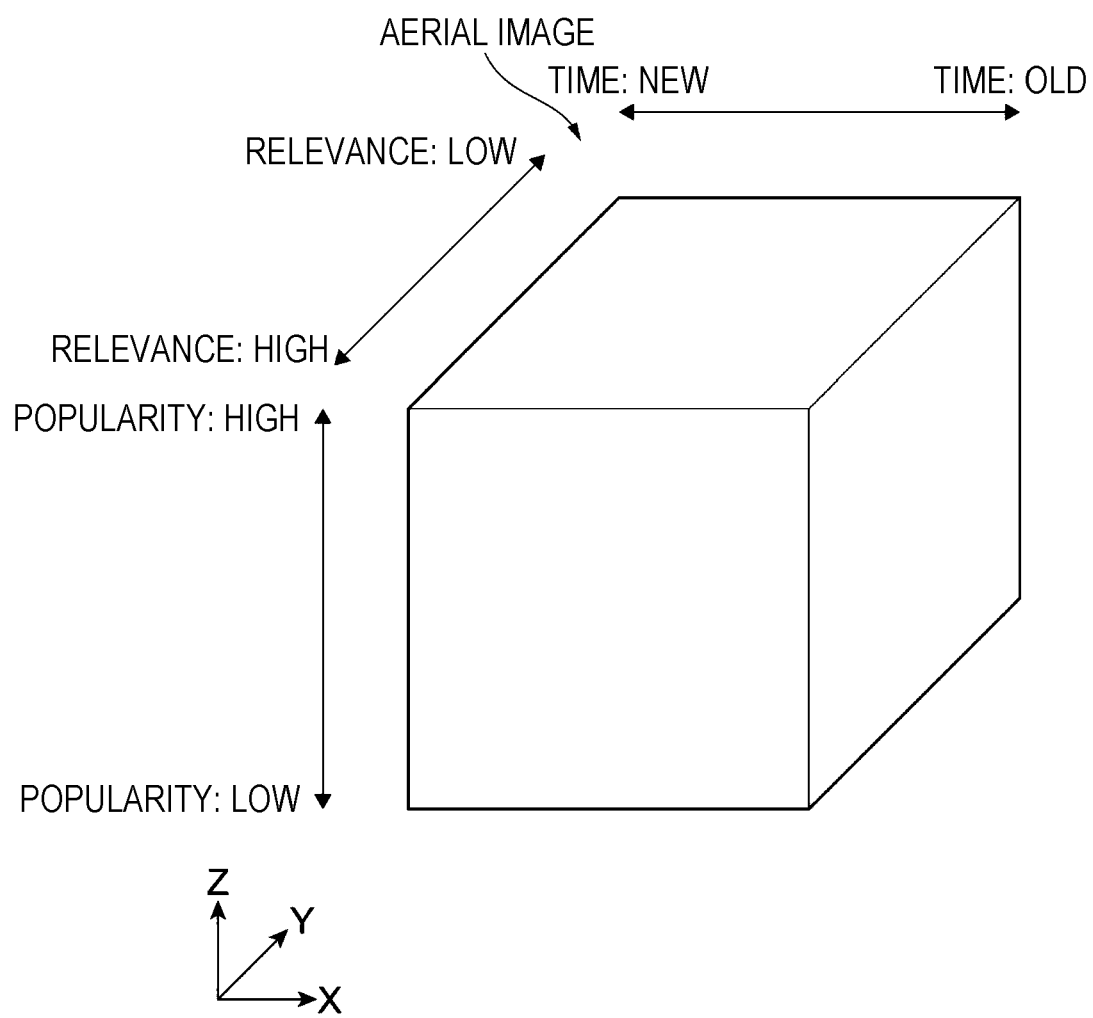
FIG. 3 illustrates an example of the presentation of information using a cubic aerial image.

FIG. 3 illustrates an example of the presentation of information using a cubic aerial image. In FIG. 3, the information is represented by the coordinate system of the aerial image in a data space.

Documents included in an unspecified folder are associated with the cubic aerial image shown in FIG. 3. The size of the cube may be fixed regardless of the number of associated documents or may be changed in accordance with the number of associated documents.

In the first exemplary embodiment, the size of the cube becomes bigger when more documents are associated and becomes smaller when fewer documents are associated. The size of the cube may be changed linearly or nonlinearly.

The size of the cube as the aerial image may be changed progressively. For example, the cube is displayed in a first size when up to ten documents are associated, and is changed to a second size when eleven to one hundred documents are associated, and is changed to a third size when one hundred one to one thousand documents are associated.

The allocation of characteristics of documents to the coordinate system of the aerial image in a data space may be determined by initial settings. Alternatively, a user may instruct how to allocate the individual characteristics of documents. In this case, a user may allocate the characteristics by using an operation screen displayed on a liquid crystal display, for example, or by using an aerial image corresponding to a list of the characteristics of documents.

If a list of the characteristics is displayed on the operation screen, the user may select a characteristic from the list and allocate it to a corresponding axis of the coordinate system on the operation screen. In this case, the user may drag and drop a characteristic selected from the list in a column of specific coordinates. The user may alternatively drag and drop a characteristic selected from an aerial image corresponding to the list of characteristics at or around a desired position of the cubic aerial image.

In the first exemplary embodiment, the time, the relevance, the popularity, and the length of a document are assumed as the selectable characteristics.

In the example in FIG. 3, the x axis of the cube represents the time. The time is older toward the right side and is newer toward the left side. The Y axis of the cube represents the relevance. For example, the relevance may be the relevance to a specific keyword, a selected document, interests of a user. Interests of a user may be registered in advance or may be found by using history information concerning the user. In the example of FIG. 3, the relevance is lower toward the far side and is higher toward the near side. The Z axis of the cube represents the popularity. In the example in FIG. 3, the popularity is higher toward the top and is lower toward the bottom.

The content of information represented by each axis may be presented on or near the cubic aerial image when the cubic aerial image is formed. The content of information may not necessarily be presented. Presenting the content of information represented by each axis makes it easy for a user to identify what kinds of characteristics of documents are used to associate the documents with the coordinates of the cube.

The intervals or increments of the index for each axis may not be uniform. For example, in the case of the x axis, the time intervals or increments between the left side indicating the newer time and the right side indicating the older time are not necessarily uniform. For example, if the value of old documents is small, the interval or increment corresponding to one year at the left side may correspond to ten years on the right side. In other words, the intervals or increments of the index for each axis may be nonlinearly provided.

The allocation of information to the individual axes in FIG. 3 is only an example.

(Examples of Processing)

Examples of processing in the first exemplary embodiment will be discussed below.

Figure 4:
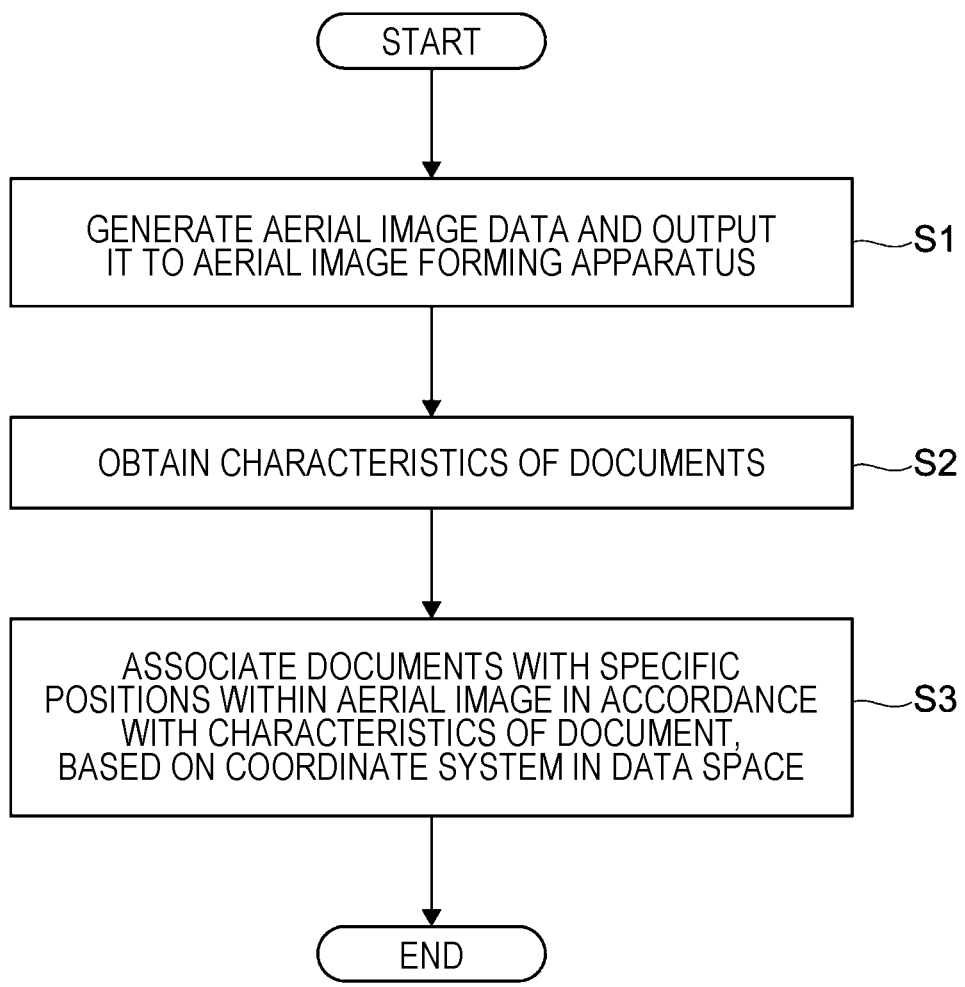
FIG. 4 is a flowchart illustrating an example of processing executed by a processor according to the first exemplary embodiment.

FIG. 4 is a flowchart illustrating an example of processing executed by the processor 21 (see FIG. 1) in the first exemplary embodiment.

In step S1, the processor 21 generates data concerning an aerial image to be formed by the aerial image forming apparatus 10 (see FIG. 1) and outputs the data to the aerial image forming apparatus 10. That is, the processor 21 outputs aerial image data to the aerial image forming apparatus 10. Upon receiving the aerial image data, the aerial image forming apparatus 10 forms an aerial image in the air based on the aerial image data.

Then, in step S2, the processor 21 obtains characteristics of subject documents.

Then, in step S3, the processor 21 associates the documents with specific positions within the aerial image in a data space in accordance with the characteristics of the document. At this stage, the documents are merely associated with the specific positions based on the coordinate system in the data space, and are not necessarily recognized by a user in the aerial image.

Figure 5:
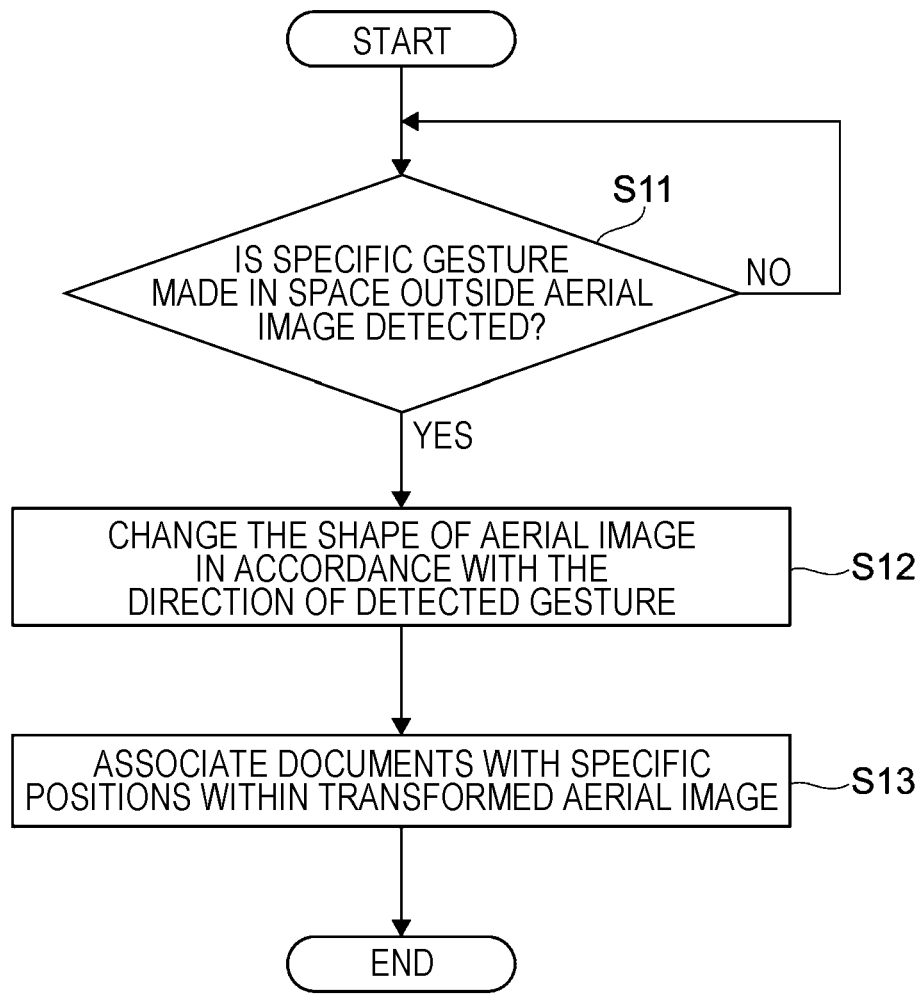
FIG. 5 is a flowchart illustrating another example of processing executed by the processor according to the first exemplary embodiment.

FIG. 5 is a flowchart illustrating another example of processing executed by the processor 21 in the first exemplary embodiment. Processing shown in FIG. 5 is processing to be executed when an instruction to change the shape of an aerial image is received.

In step S11, the processor 21 judges whether a specific gesture made in a space outside an aerial image is detected. The processor 21 identifies the content of the gesture based on a detection signal of the sensor 30. Specific examples of a specific gesture will be discussed later.

While the result of step S11 is NO, the processor 21 repeatedly executes step S11.

If the result of step S11 is YES, the processor 21 proceeds to step S12 to change the shape of the aerial image in accordance with the direction of the detected gesture.

Then, in step S13, the processor 21 associates documents with specific positions within the transformed aerial image.

Examples of the specific gesture detected in step S11 and the transformation of the aerial image in step S12 will be explained below.

Figure 6A:
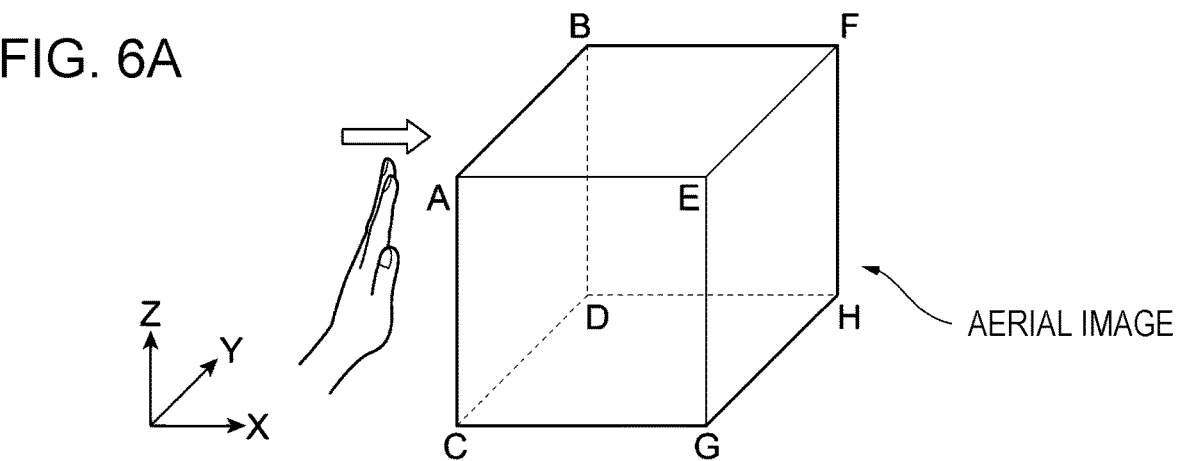
FIGS. 6A, 6B, and 6C illustrate examples of the transformation of a cubic aerial image in accordance with certain gestures.
Figure 6B:
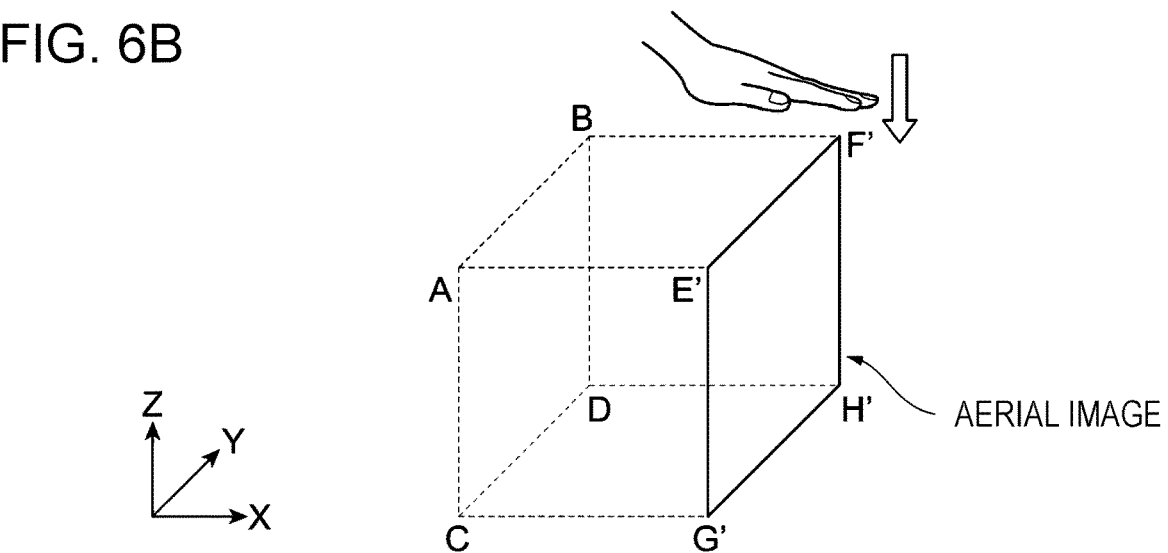
Figure 6C:
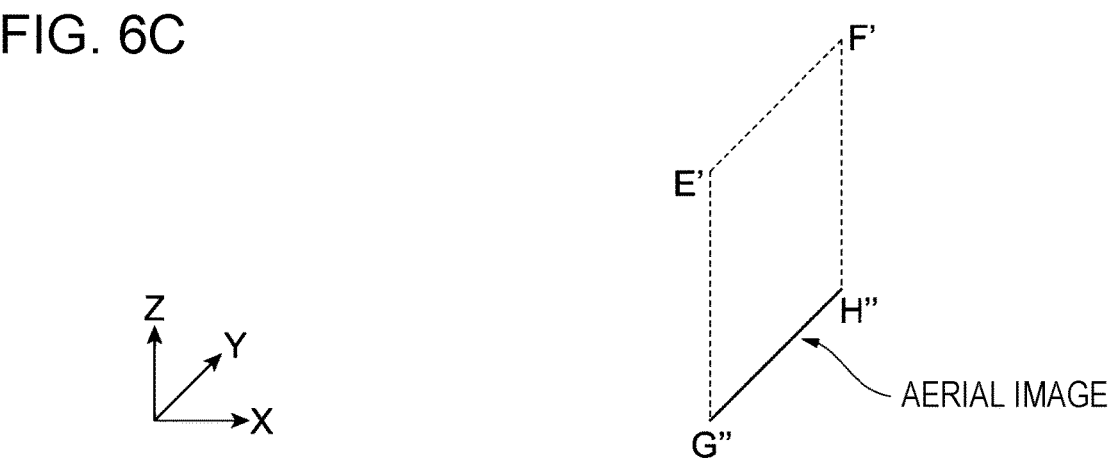

FIGS. 6A, 6B, and 6C illustrate examples of the transformation of a cubic aerial image in accordance with certain gestures.

FIG. 6A illustrates a state in which a palm is placed over the quadrilateral ABCD in the cubic aerial image. In accordance with a gesture of moving the palm in the X-axis direction from this state, the processor 21 changes the shape of the aerial image. In one example, in accordance with a gesture of moving the palm in the direction toward the quadrilateral EFGH positioned in parallel with the quadrilateral ABCD, as indicated by the arrow in FIG. 6A, the processor 21 gradually decreases the lengths of the sides AE, BF, CG, and DH of the aerial image parallel with the X-axis direction. When the palm stops moving, the processor 21 also stops decreasing the lengths of the sides AE, BF, CG, and DH of the aerial image. When the palm reaches the position at the quadrilateral EFGH, the sides AE, BF, CG, and DH of the aerial image disappear. That is, the quadrilateral ABCD and the quadrilateral EFGH join together so as to transform the aerial image into one quadrilateral. This quadrilateral may be called the quadrilateral ABCD or the quadrilateral EFGH or in another way. In FIG. 6B, this quadrilateral is called the quadrilateral EFGH'. If the initial shape of the aerial image is a cube, it is gradually transformed into a rectangular parallelepiped and then into a square.

FIG. 6B illustrates a state in which a palm is placed over the top side EF' of the quadrilateral EFGH' (square in this example). In accordance with a gesture of moving the palm in the Z-axis direction from this state, the processor 21 changes the shape of the aerial image. In one example, in accordance with a gesture of moving the palm in the direction toward the side GH' positioned in parallel with the side EF', as indicated by the arrow in FIG. 6B, the processor 21 gradually decreases the lengths of the sides EG' and FH' of the aerial image parallel with the Z-axis direction. When the palm stops moving, the processor 21 also stops decreasing the lengths of the sides EG' and FH' of the aerial image. When the palm reaches the position at the side GH', the sides EG' and FH' of the aerial image disappear. That is, the sides EF' and GH' join together so as to transform the aerial image into one line segment shown in FIG. 6C. This line segment may be called the line segment EF' or the line segment GH' or in another way. In this example, this line segment is called the line segment GH".

FIG. 6C illustrates the aerial image after the palm has moved from the position at the side EF' to the position at the side GH'. In accordance with a gesture of moving the palm placed over one of the points G" and H" toward the other one of the points H" or G", the processor 21 changes the shape of the aerial image, though this operation is not shown in FIG. 6C. In one example, in accordance with a gesture of moving the palm from the point G" to the point H", the processor 21 gradually decreases the length of the side GH". When the palm stops moving, the processor 21 also stops decreasing the length of the side GH". When the palm reaches the position at the point H", the aerial image is transformed into the mere point H". This point may be called the point G" or the point H" or in another way. When an aerial image converges into one point in this manner, it means that all information is mapped on one point.

FIGS. 6A through 6C show examples in which the shape of the aerial image is changed by making a gesture with one hand. Alternatively, the shape of the aerial image may be changed by making a gesture with both hands. For example, in FIG. 6A, one hand is placed over the quadrilateral ABCD of the cube, while the other hand is placed over the quadrilateral EFGH positioned in parallel with the quadrilateral ABCD. Then, both hands are moved in the X-axis direction. The position of the quadrilateral ABCD and that of the quadrilateral EFGH are changed in accordance with the positions of the individual hands, and the lengths of the sides AE, BF, CG, and DH are accordingly increased or decreased. When both hands are held together at a certain position, the cubic aerial image is transformed into a quadrilateral at this position. When both hands are spread outwards to reach certain positions, the quadrilateral ABCD and the quadrilateral EFGH are moved to these positions. As a result, the cube ABCDEFGH is transformed into a rectangular parallelepiped with the increased sides AE, BF, CG, and DH. As in the aerial image in FIG. 6A, the shapes of the aerial images shown in FIGS. 6B and 6C may also be changed by making a gesture with both hands.

The approach to transforming the aerial images as shown in FIGS. 6A through 6C can be utilized for restricting the characteristics to be allocated to aerial images formed in the air. For example, in the aerial image in FIG. 6A, the position of a document can be determined in terms of three characteristics. In the aerial image in FIG. 6B, the position of a document can be determined in terms of two characteristics. In the aerial image in FIG. 6C, the position of a document can be determined in terms of one characteristic.

For example, step S13 in FIG. 5, that is, the operation executed by the processor 21 for associating the documents with the specific positions within the transformed aerial image, will be explained in detail through illustration of the specific examples of FIGS. 6A through 6C. When the aerial image is transformed from the cube ABCDEFGH shown in FIG. 6A into the quadrilateral EFGH' shown in FIG. 6B, it loses a length in the X-axis direction. If the X axis, the Y axis, and the Z axis of the cube ABCDEFGH in FIG. 6A respectively represent the time, the relevance, and the popularity, the Y axis and the Z axis of the quadrilateral EFGH' in FIG. 6B represent the relevance and the popularity, respectively. That is, when documents are associated with a cubic aerial image, they are associated with the positions representing the three characteristics, namely, the time, the relevance, and the popularity. When documents are associated with a square aerial image, they are associated with the positions representing the two characteristics, namely, the relevance and the popularity.

Likewise, when the aerial image is transformed from the quadrilateral EFGH' shown in FIG. 6B to the line segment GH" shown in FIG. 6C, it loses a length in the Z-axis direction. If the Y axis and the Z axis of the quadrilateral EFGH' in FIG. 6B respectively represent the relevance and the popularity, the line segment GH" in parallel with the Y-axis direction represents the relevance. That is, when documents are associated with a line-segment aerial image, they are associated with the positions representing only one characteristic, namely, the relevance.

When the aerial image is transformed from the line segment GH" shown in FIG. 6C to the point H", it loses a length in the Y-axis direction. If the line segment GH" represents the relevance, the point H" does not represent any characteristics.

Figure 7A:
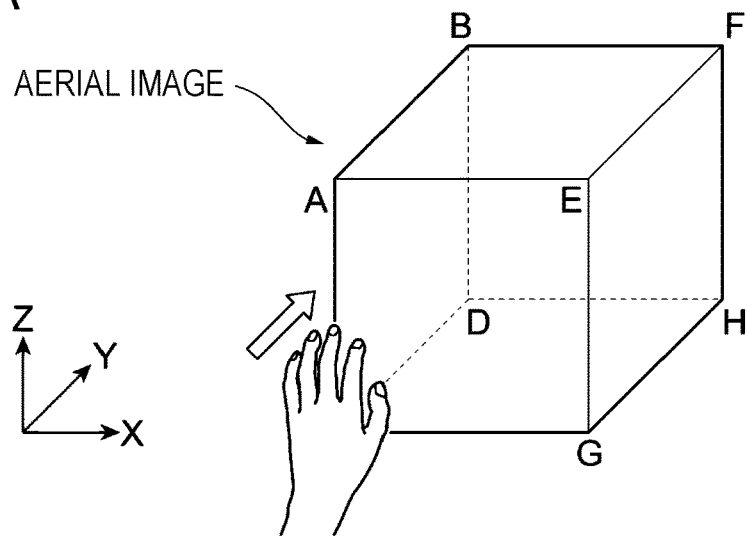
FIGS. 7A, 7B, and 7C illustrate other examples of the transformation of a cubic aerial image in accordance with certain gestures.
Figure 7B:
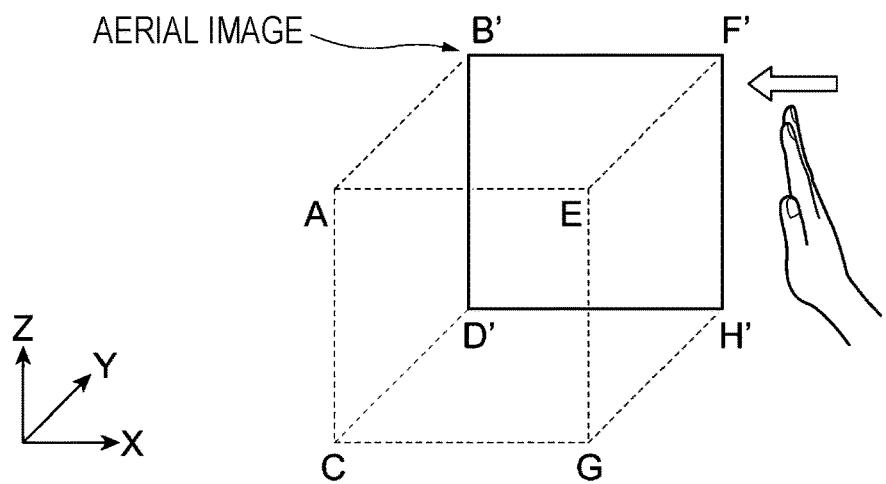
Figure 7C:
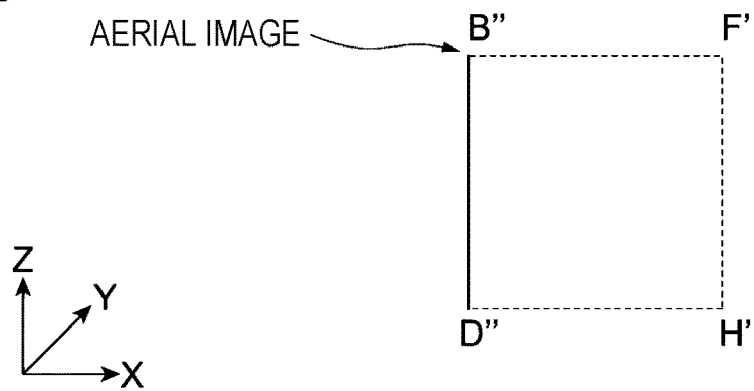

FIGS. 7A, 7B, and 7C illustrate other examples of the transformation of a cubic aerial image in accordance with certain gestures.

FIG. 7A illustrates a state in which a palm is placed over the quadrilateral AECG in the cubic aerial image. In accordance with a gesture of moving the palm in the Y-axis direction from this state, the processor 21 changes the shape of the aerial image. In one example, in accordance with a gesture of moving the palm in the direction toward the quadrilateral BFDH positioned in parallel with the quadrilateral AECG, as indicated by the arrow in FIG. 7A, the processor 21 gradually decreases the lengths of the sides AB, EF, CD, and GH of the aerial image parallel with the Y-axis direction. When the palm stops moving, the processor 21 also stops decreasing the lengths of the sides AB, EF, CD, and GH of the aerial image. When the palm reaches the position at the quadrilateral BFDH, the sides AB, EF, CD, and GH of the aerial image disappear. That is, the quadrilateral AECG and the quadrilateral BFDH join together so as to transform the aerial image into one quadrilateral. This quadrilateral may be called the quadrilateral AECG or the quadrilateral BFDH or in another way. In FIG. 7B, this quadrilateral is called the quadrilateral BFDH'. If the initial shape of the aerial image is a cube, it is gradually transformed into a rectangular parallelepiped and then into a square.

FIG. 7B illustrates a state in which a palm is placed over the right side FH' of the quadrilateral BFDH' (square in this example). In accordance with a gesture of moving the palm in the X-axis direction from this state, the processor 21 changes the shape of the aerial image. In one example, in accordance with a gesture of moving the palm in the direction toward the side BD' positioned in parallel with the side FH', as indicated by the arrow in FIG. 7B, the processor 21 gradually decreases the lengths of the sides BF' and DH' of the aerial image parallel with the X-axis direction. When the palm stops moving, the processor 21 also stops decreasing the lengths of the sides BF' and DH' of the aerial image. When the palm reaches the position at the side BD', the sides BF' and DH' of the aerial image disappear. That is, the sides BD' and FH' join together so as to transform the aerial image into one line segment shown in FIG. 7C. This line segment may be called the line segment BD' or the line segment FH' or in another way. In this example, this line segment is called the line segment BD".

FIG. 7C illustrates the aerial image after the palm has moved from the position at the side FH' to the position at the side BD'. In accordance with a gesture of moving the palm placed over one of the points B" and D" toward the other one of the points D" or B", the processor 21 changes the shape of the aerial image, though this operation is not shown in FIG. 7C. In one example, in accordance with a gesture of moving the palm from the point B" to the point D", the processor 21 gradually decreases the length of the side BD". When the palm stops moving, the processor 21 also stops decreasing the length of the side BD". When the palm reaches the position at the point D", the aerial image is transformed into the mere point D". This point may be called the point B" or the point D" or in another way. When an aerial image converges into one point in this manner, it means that all information is mapped on one point.

FIGS. 7A through 7C show examples in which the shape of the aerial image is changed by making a gesture with one hand. Alternatively, the shape of the aerial image may be changed by making a gesture with both hands. For example, in FIG. 7A, one hand is placed over the quadrilateral AECG of the cube, while the other hand is placed over the quadrilateral BFDH positioned in parallel with the quadrilateral AECG. Then, both hands are moved in the Y-axis direction. The position of the quadrilateral AECG and that of the quadrilateral BFDH are changed in accordance with the positions of the individual hands, and the lengths of the sides AB, EF, CD, and GH are accordingly increased or decreased. When both hands are held together at a certain position, the cubic aerial image is transformed into a quadrilateral at this position. When both hands are spread outwards to reach certain positions, the quadrilateral AECG and the quadrilateral BFDH are moved to these positions. As a result, the cube ABCDEFGH is transformed into a rectangular parallelepiped with the increased sides AB, EF, CD, and GH. As in the aerial image in FIG. 7A, the shapes of the aerial images shown in FIGS. 7B and 7C may also be changed by making a gesture with both hands.

The approach to transforming the aerial images as shown in FIGS. 7A through 7C can also be utilized for restricting the characteristics to be allocated to aerial images formed in the air. For example, in the aerial image in FIG. 7A, the position of a document can be determined in terms of three characteristics. In the aerial image in FIG. 7B, the position of a document can be determined in terms of two characteristics. In the aerial image in FIG. 7C, the position of a document can be determined in terms of one characteristic.

For example, step S13 in FIG. 5, that is, the operation executed by the processor 21 for associating the documents with the specific positions within the transformed aerial image, will be explained in detail through illustration of the specific examples of FIGS. 7A through 7C. When the aerial image is transformed from the cube ABCDEFGH shown in FIG. 7A into the quadrilateral BFDH' shown in FIG. 7B, it loses a length in the Y-axis direction. If the X axis, the Y axis, and the Z axis of the cube ABCDEFGH in FIG. 7A respectively represent the time, the relevance, and the popularity, the X axis and the Z axis of the quadrilateral BFDH' in FIG. 7B represent the time and the popularity, respectively. That is, when documents are associated with a cubic aerial image, they are associated with the positions representing the three characteristics, namely, the time, the relevance, and the popularity. When documents are associated with a square aerial image, they are associated with the positions representing the two characteristics, namely, the time and the popularity.

Likewise, when the aerial image is transformed from the quadrilateral BFDH' shown in FIG. 7B to the line segment BD" shown in FIG. 7C, it loses a length in the X-axis direction. If the X axis and the Z axis of the quadrilateral BFDH' in FIG. 7B respectively represent the time and the popularity, the line segment BD" in parallel with the Z-axis direction represents the popularity. That is, when documents are associated with a line-segment aerial image, they are associated with the positions representing only one characteristic, namely, the popularity.

When the aerial image is transformed from the line segment BD" shown in FIG. 7C to the point D", it loses a length in the Z-axis direction. If the line segment BD" represents the popularity, the point D" does not represent any characteristics.

Figure 8A:
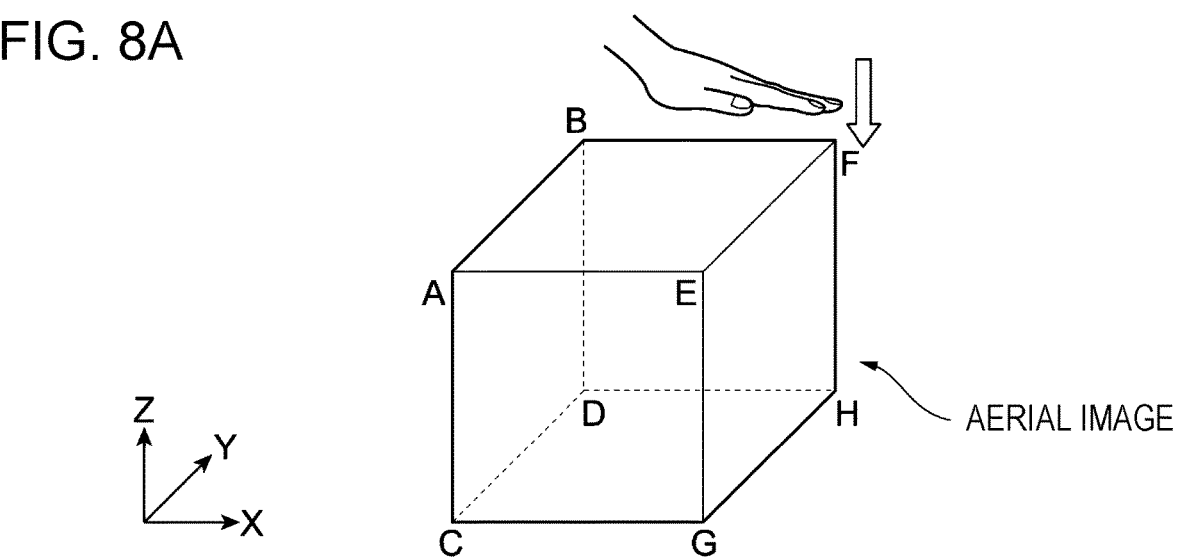
FIGS. 8A, 8B, and 8C illustrate other examples of the transformation of a cubic aerial image in accordance with certain gestures.
Figure 8B:
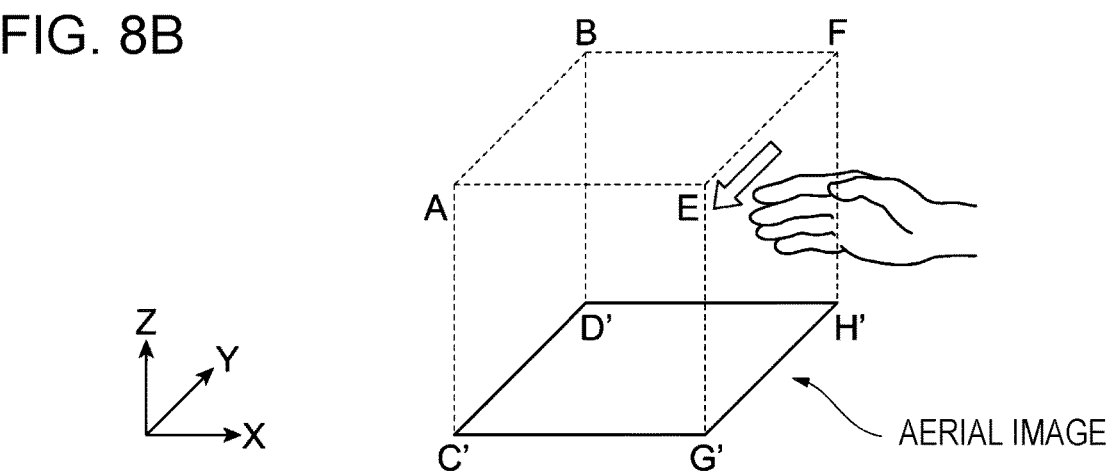
Figure 8C:
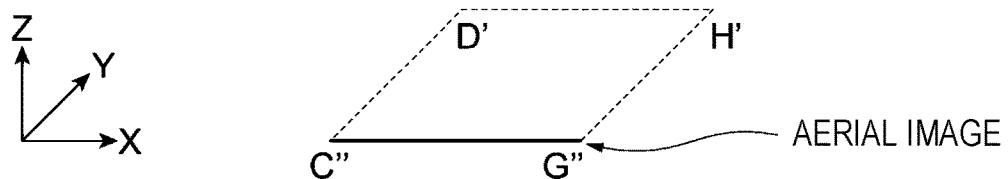

FIGS. 8A, 8B, and 8C illustrate other examples of the transformation of a cubic aerial image in accordance with certain gestures.

FIG. 8A illustrates a state in which a palm is placed over the quadrilateral ABEF in the cubic aerial image. In accordance with a gesture of moving the palm in the Z-axis direction from this state, the processor 21 changes the shape of the aerial image. In one example, in accordance with a gesture of moving the palm in the direction toward the quadrilateral CDGH positioned in parallel with the quadrilateral ABEF, as indicated by the arrow in FIG. 8A, the processor 21 gradually decreases the lengths of the sides AC, BD, EG, and FH of the aerial image parallel with the X-axis direction. When the palm stops moving, the processor 21 also stops decreasing the lengths of the sides AC, BD, EG, and FH of the aerial image. When the palm reaches the position at the quadrilateral CDGH, the sides AC, BD, EG, and FH of the aerial image disappear. That is, the quadrilateral ABEF and the quadrilateral CDGH join together so as to transform the aerial image into one quadrilateral. This quadrilateral may be called the quadrilateral ABEF or the quadrilateral CDGH or in another way. In FIG. 8B, this quadrilateral is called the quadrilateral CDGH'. If the initial shape of the aerial image is a cube, it is gradually transformed into a rectangular parallelepiped and then into a square.

FIG. 8B illustrates a state in which a palm is placed over the back side DH' of the quadrilateral CDGH' (square in this example). In accordance with a gesture of moving the palm in the Y-axis direction from this state, the processor 21 changes the shape of the aerial image. In one example, in accordance with a gesture of moving the palm in the direction toward the side CG' positioned in parallel with the side DH', as indicated by the arrow in FIG. 8B, the processor 21 gradually decreases the lengths of the sides CD' and GH' of the aerial image parallel with the Y-axis direction. When the palm stops moving, the processor 21 also stops decreasing the lengths of the sides CD' and GH' of the aerial image. When the palm reaches the position at the side CG', the sides CD' and GH' of the aerial image disappear. That is, the sides DH' and CG' join together so as to transform the aerial image into one line segment shown in FIG. 8C. This line segment may be called the line segment CG' or the line segment DH' or in another way. In this example, this line segment is called the line segment CG".

FIG. 8C illustrates the aerial image after the palm has moved from the position at the side DH' to the position at the side CG'. In accordance with a gesture of moving the palm placed over one of the points C" and G" toward the other one of the points G" or C", the processor 21 changes the shape of the aerial image, though this operation is not shown in FIG. 8C. In one example, in accordance with a gesture of moving the palm from the point C" to the point G", the processor 21 gradually decreases the length of the side CG". When the palm stops moving, the processor 21 also stops decreasing the length of the side CG". When the palm reaches the position at the point G", the aerial image is transformed into the mere point G". This point may be called the point C" or the point G" or in another way. When an aerial image converges into one point in this manner, it means that all information is mapped on one point.

FIGS. 8A through 8C show examples in which the shape of the aerial image is changed by making a gesture with one hand. Alternatively, the shape of the aerial image may be changed by making a gesture with both hands. For example, in FIG. 8A, one hand is placed over the quadrilateral ABEF of the cube, while the other hand is placed over the quadrilateral CDGH positioned in parallel with the quadrilateral ABEF. Then, both hands are moved in the Z-axis direction. The position of the quadrilateral ABEF and that of the quadrilateral CDGH are changed in accordance with the positions of the individual hands, and the lengths of the sides AC, BD, EG, and FH are accordingly increased or decreased. When both hands are held together at a certain position, the cubic aerial image is transformed into a quadrilateral at this position. When both hands are spread outwards to reach certain positions, the quadrilateral ABEF and the quadrilateral CDGH are moved to these positions. As a result, the cube ABCDEFGH is transformed into a rectangular parallelepiped with the increased sides AC, BD, EG, and FH. As in the aerial image in FIG. 8A, the shapes of the aerial images shown in FIGS. 8B and 8C may also be changed by making a gesture with both hands.

The approach to transforming the aerial images as shown in FIGS. 8A through 8C can also be utilized for restricting the characteristics to be allocated to aerial images formed in the air. For example, in the aerial image in FIG. 8A, the position of a document can be determined in terms of three characteristics. In the aerial image in FIG. 8B, the position of a document can be determined in terms of two characteristics. In the aerial image in FIG. 8C, the position of a document can be determined in terms of one characteristic.

For example, step S13 in FIG. 5, that is, the operation executed by the processor 21 for associating the documents with the specific positions within the transformed aerial image, will be explained in detail through illustration of the specific examples of FIGS. 8A through 8C. When the aerial image is transformed from the cube ABCDEFGH shown in FIG. 8A into the quadrilateral CDGH' shown in FIG. 8B, it loses a length in the Z-axis direction. If the X axis, the Y axis, and the Z axis of the cube ABCDEFGH in FIG. 8A respectively represent the time, the relevance, and the popularity, the X axis and the Y axis of the quadrilateral CDGH' in FIG. 8B represent the time and the relevance, respectively. That is, when documents are associated with a cubic aerial image, they are associated with the positions representing the three characteristics, namely, the time, the relevance, and the popularity. When documents are associated with a square aerial image, they are associated with the positions representing the two characteristics, namely, the time and the relevance.

Likewise, when the aerial image is transformed from the quadrilateral CDGH' shown in FIG. 8B to the line segment CG" shown in FIG. 8C, it loses a length in the Y-axis direction. If the X axis and the Y axis of the quadrilateral CDGH' in FIG. 8B respectively represent the time and the relevance, the line segment CG" in parallel with the X-axis direction represents the time. That is, when documents are associated with a line-segment aerial image, they are associated with the positions representing only one characteristic, namely, the time.

When the aerial image is transformed from the line segment CG" shown in FIG. 8C to the point G", it loses a length in the X-axis direction. If the line segment CG" represents the time, the point G" does not represent any characteristics.

In the examples of FIGS. 6A through 8C, an aerial image is transformed from a three-dimensional (solid) figure into a two-dimensional (plane) figure, and then into a linear (line segment) figure. Conversely, an aerial image may be transformed from a linear (line segment) figure into a two-dimensional (plane) figure, and then into a three-dimensional (solid) figure. For example, a user holds the line segment CG" shown in FIG. 8C with both hands and stretches them out in the Y-axis direction. Then, the line segment CG" representing the characteristic "time" is transformed into a quadrilateral representing the characteristic "time" associated with the X axis and the characteristic "relevance" associated with the Y axis.

A user holds the quadrilateral CDGH' shown in FIG. 8B with both hands and then stretches them out in the Z-axis direction. Then, the quadrilateral CDGH' representing the characteristic "time" associated with the X axis and the characteristic "relevance" associated with the Y axis into a cube representing the three characteristics "time", "relevance", and "popularity" associated with the X axis, the Y axis, and the Z axis, respectively.

The aerial image may be transformed into a shape other than a cube, a plane, and a line segment represented by all or some of the points A, B, C, D, E, F, G, and H. For example, a user holds the quadrilateral CDGH' shown in FIG. 8B with both hands. While keeping one hand on the quadrilateral CDGH', the user releases the other hand in the direction opposite the quadrilateral ABEF (farther downward than the quadrilateral CDGH' in FIG. 8B). Then, the quadrilateral CDGH' is transformed into a solid figure at positions different from those defining the cube ABCDEFGH.

In another example, a user holds the quadrilateral CDGH' shown in FIG. 8B with both hands. The user then moves one hand toward the quadrilateral ABEF and the other hand in the direction opposite the quadrilateral ABEF. Then, the quadrilateral CDGH' is transformed into a solid figure such that two opposing surfaces of the solid figure are located at positions at which the two hands are stretched outwards.

The above-described gestures are only examples. The shape of an aerial image may be changed in accordance with a different gesture. A gesture of bringing two separate objects into close to or contact with each other may be in line with people's sense of "shrinking" or "decreasing". Conversely, a gesture of separating two objects contacting each other may be in line with the people's sense of "extending" or "increasing". It is thus highly likely that users can intuitively understand the meanings of these gestures.

A user may use a fingertip to make a gesture. For example, a user places two fingertips of one hand over opposing line segments of a two-dimensional figure or opposing planes of a solid figure, and then brings the two fingertips into close to or contact with each other, thereby transforming a plane into a line segment or a solid figure into a plane figure. Conversely, a user holds a line segment or a plane with two fingertips of one hand and then separate them, thereby transforming a line segment into a plane figure or a plane into a solid figure. A gesture may be made with an object other than part of a human body. For example, a robot hand or the tip of a pen held by a user may be used.

Figure 9A:
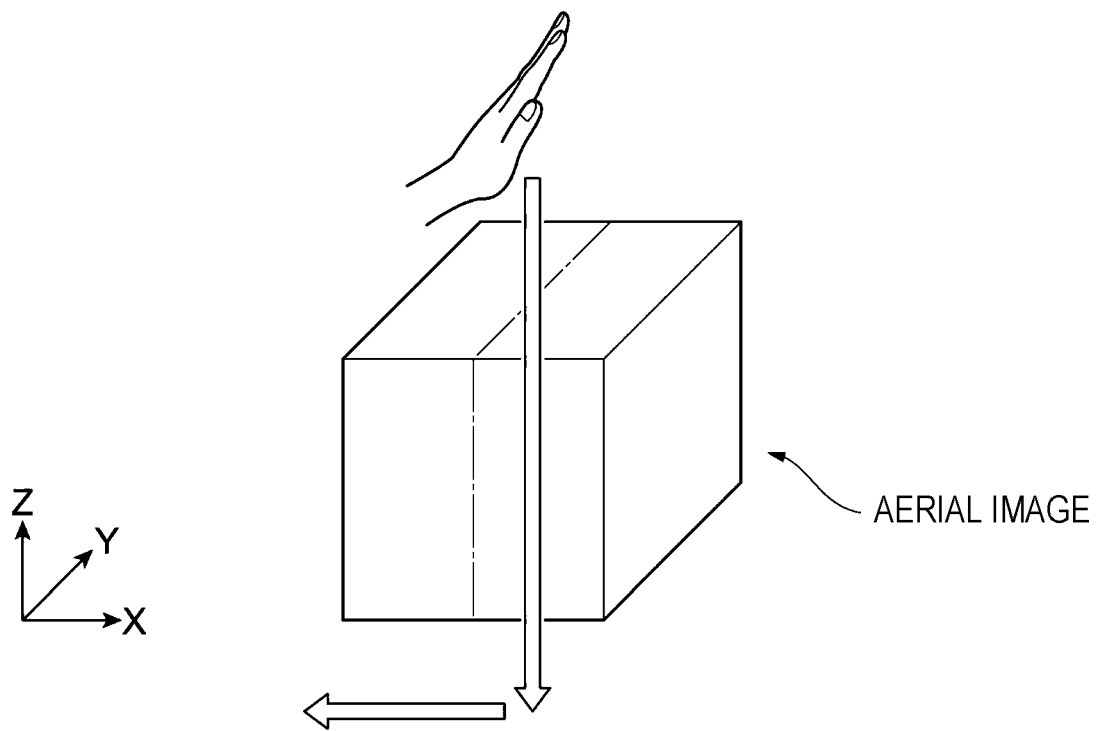
FIGS. 9A and 9B illustrate an example in which a gesture of cutting a cubic aerial image is made to change its shape.
Figure 9B:
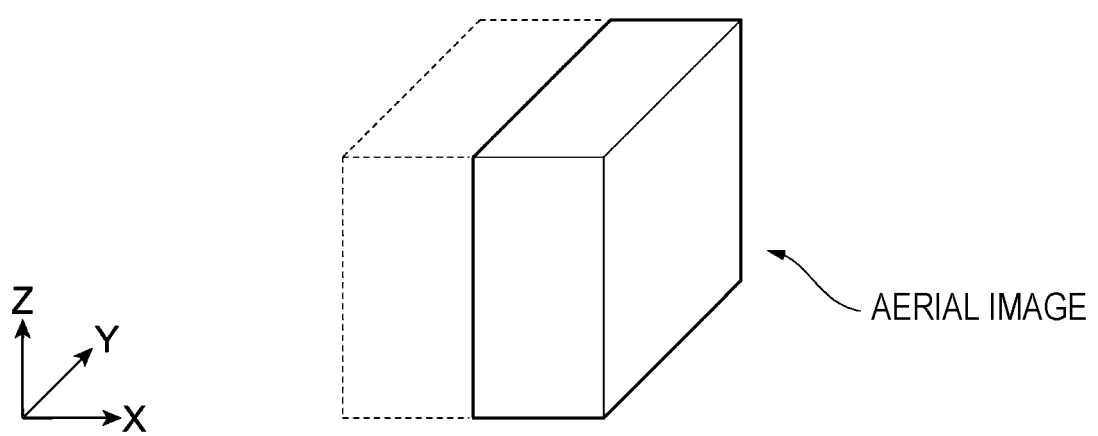

FIGS. 9A and 9B illustrate an example in which a gesture of cutting a cubic aerial image is made to change its shape. FIG. 9A illustrates that a palm is moved from the top surface to the bottom surface of the cubic aerial image across the Y axis and is then shifted toward the left side in the X axis direction. FIG. 9B illustrates the resulting aerial image. In this example, the right-side portion of the cubic aerial image is left in the air.

When the palm is moved only in the top-bottom direction (Z-axis direction in this example) at a certain position, the cubic aerial image may be separated into the left-side portion and the right-side portion based on this position. As a result of cutting an aerial image into multiple portions, corresponding documents can be stored in a separate folder or be distributed to another user.

When the palm is shifted twice in the Z-axis direction of the cubic aerial image, the left-side portion and the right-side portion of the cubic aerial image may be removed, while only the central portion in the X-axis direction may be left.

The approach to transforming the aerial image as shown in FIGS. 9A and 9B can be utilized for restricting documents to be allocated to an aerial image formed in the air. In other words, transforming of an aerial image may be utilized for reducing the number of documents to be handled in the aerial image.

Figure 10A:
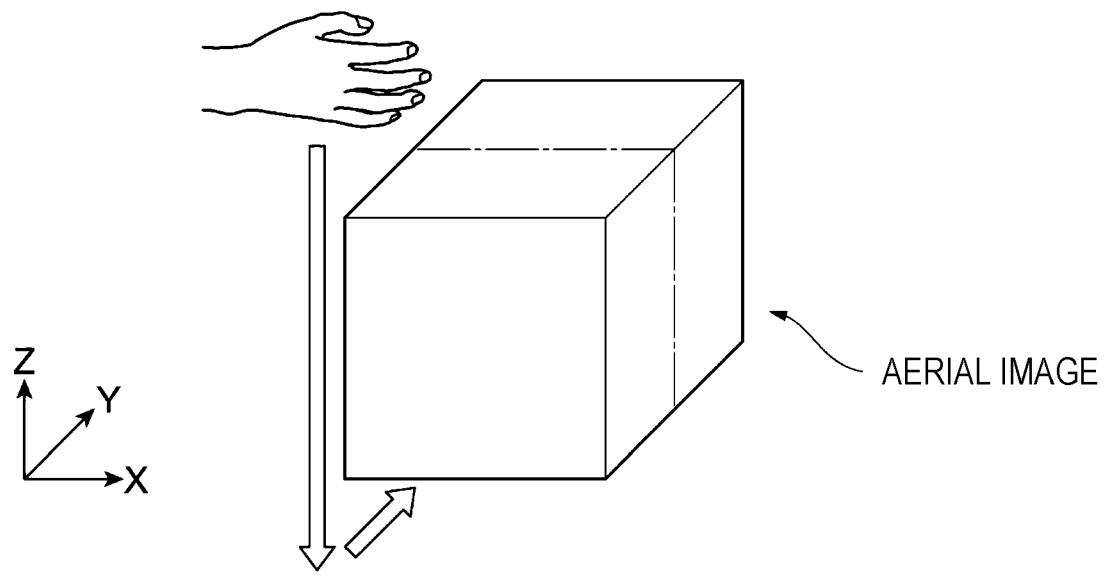
FIGS. 10A and 10B illustrate another example in which a gesture of cutting a cubic aerial image is made to change its shape.
Figure 10B:
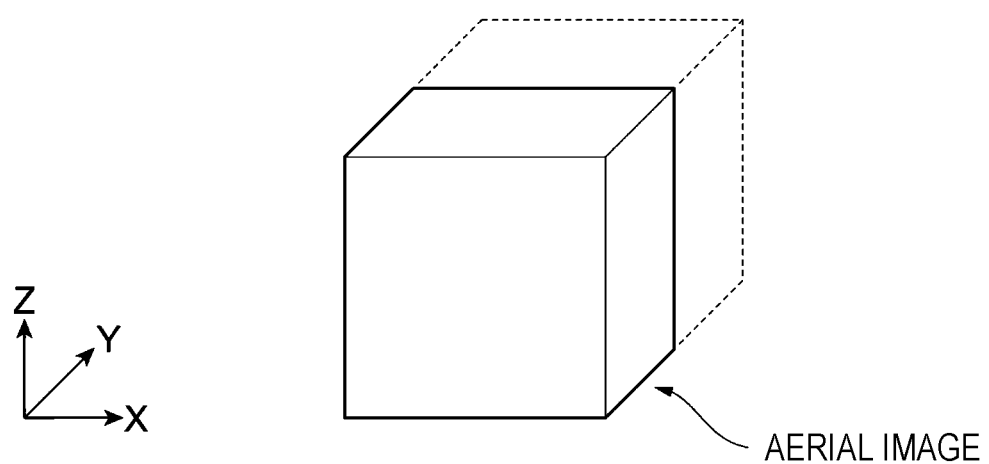

FIGS. 10A and 10B illustrate another example in which a gesture of cutting a cubic aerial image is made to change its shape. FIG. 10A illustrates that a palm is moved from the top surface to the bottom surface of the cubic aerial image across the X axis and is then shifted toward the back side in the Y axis direction. FIG. 10B illustrates the resulting aerial image. In this example, the front-side portion of the cubic aerial image is left in the air. When the palm is moved in the top-bottom direction (Z-axis direction in this example) at a certain position and is then shifted toward the front side in the Y-axis direction, the back-side portion of the cubic aerial image from this position is left. As in FIGS. 9A and 9B, in FIGS. 10A and 10B, the front-side portion and the back-side portion of the cubic aerial image may be removed, while only the central portion in the Y-axis direction may be left.

Figure 11A:
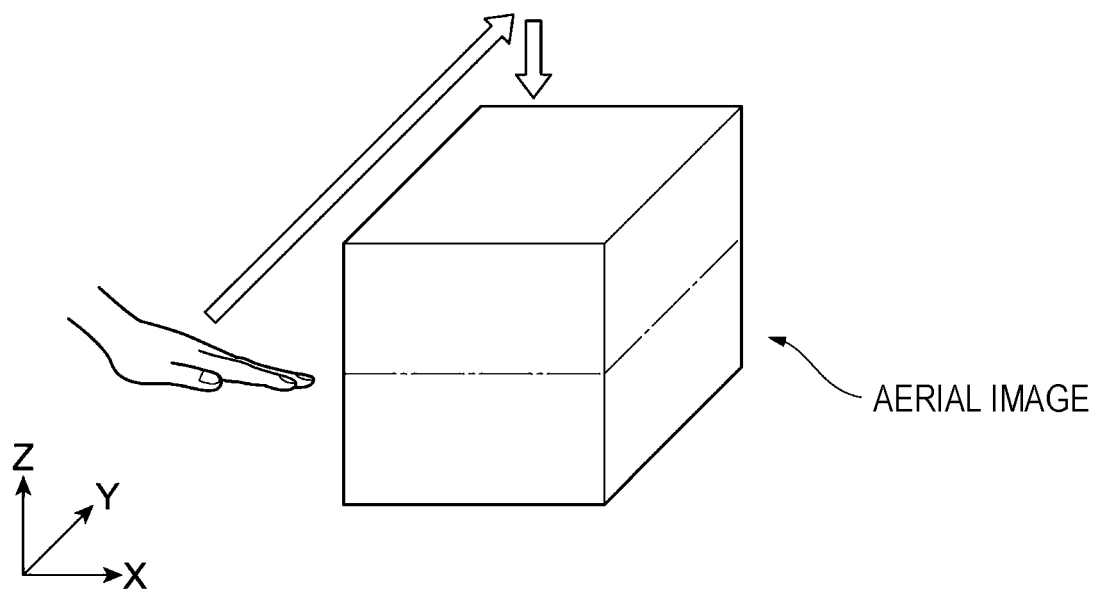
FIGS. 11A and 11B illustrate another example in which a gesture of cutting a cubic aerial image is made to change its shape.
Figure 11B:
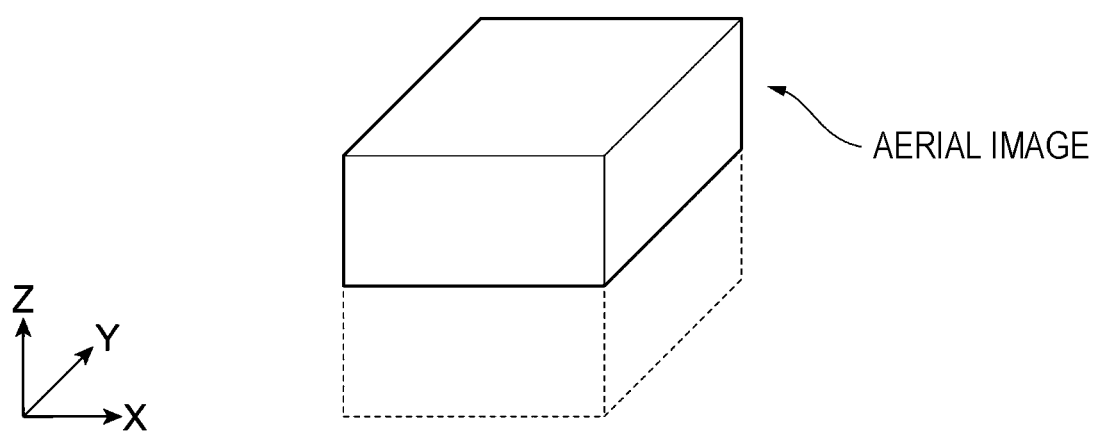

FIGS. 11A and 11B illustrate another example in which a gesture of cutting a cubic aerial image is made to change its shape. FIG. 11A illustrates that a palm is moved in a horizontal direction (parallel with a plane defined by the X axis and the Y axis in this example) of the aerial image and is then shifted downward (Z-axis direction). FIG. 11B illustrates the resulting aerial image. In this example, the top-side portion of the cubic aerial image is left in the air. When the palm is moved in the horizontal direction of the cubic aerial image and is shifted upward (Z-axis direction), the bottom-side portion of the cubic aerial image is left in the air. As in FIGS. 9A and 9B, in FIGS. 11A and 11B, the top-side portion and the bottom-side portion of the cubic aerial image may be removed, while only the central portion in the Z-axis direction may be left.

When a cubic aerial image is transformed such that only part of the cubic aerial image is removed, it may be transformed to be seen in an L-like shape or a stepwise shape as viewed from a specific direction.

The size of an aerial image may be enlarged or reduced with a gesture.

Figure 12A:
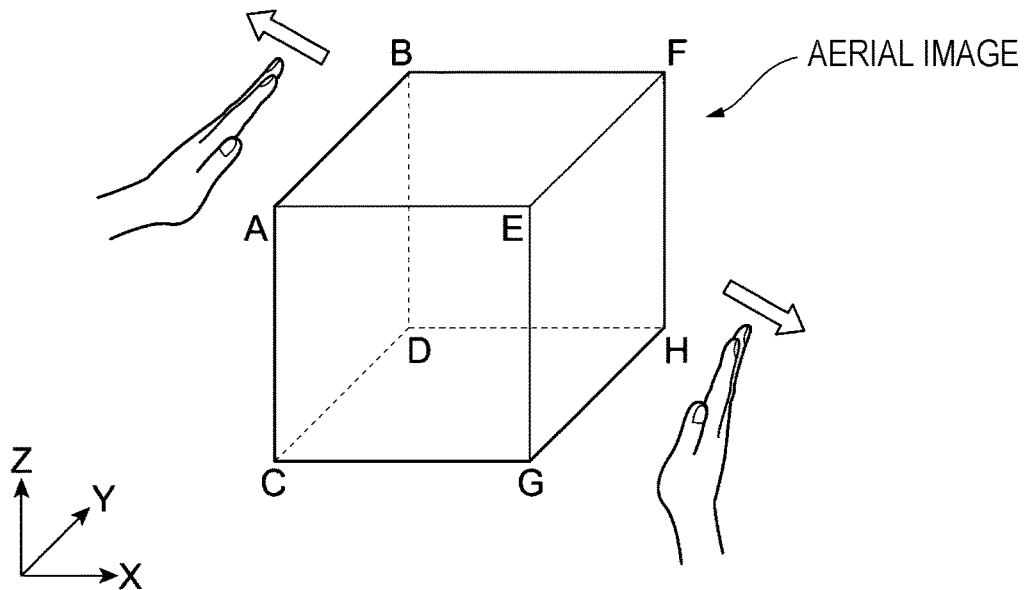
FIGS. 12A and 12B illustrate an example in which a cubic aerial image is enlarged with a gesture.
Figure 12B:
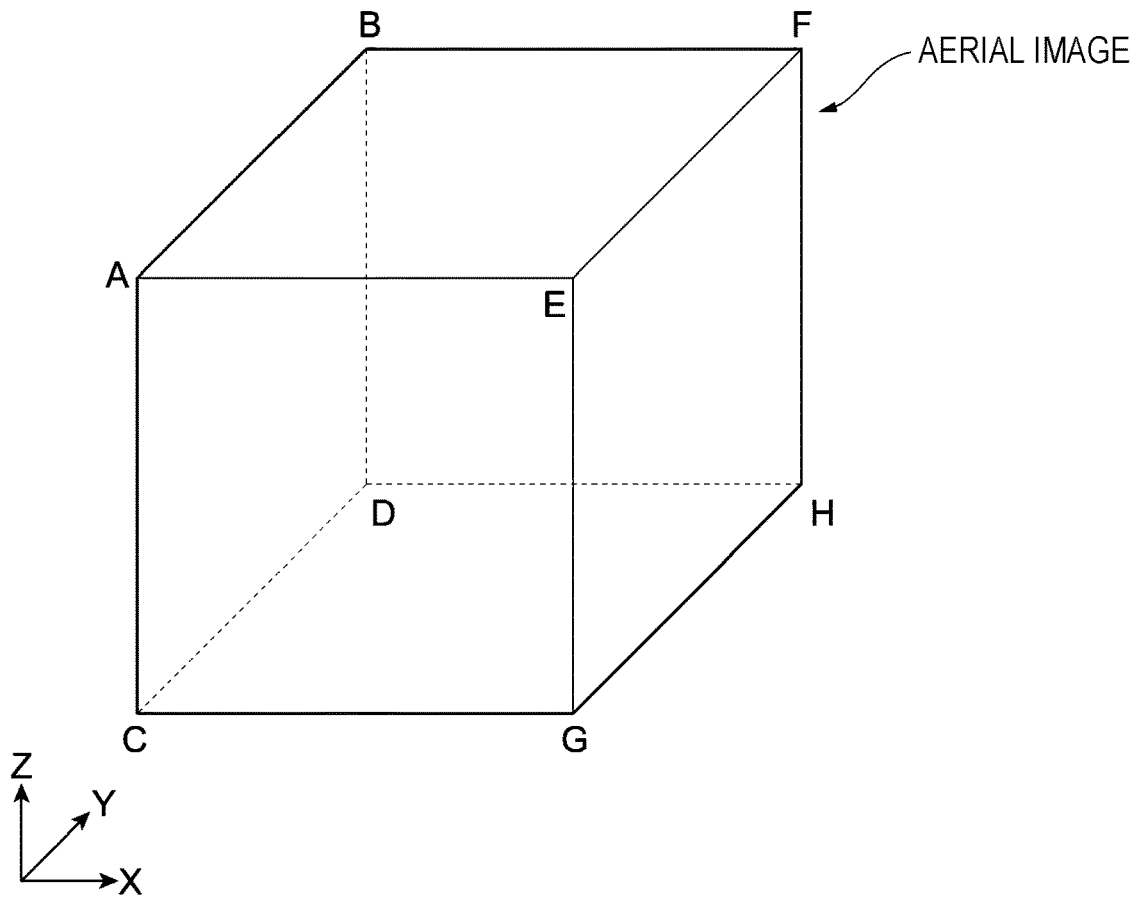

FIGS. 12A and 12B illustrate an example in which a cubic aerial image is enlarged with a gesture. FIG. 12A illustrates a gesture of spreading both hands diagonally with respect to the aerial image. FIG. 12B illustrates the resulting aerial image. A cubic aerial image may be enlarged in a specific direction without necessarily maintaining the cubic shape. For example, a user may hold a pair of opposing quadrilaterals of a cubic aerial image with both hands and then spread them to increase the distance between the quadrilaterals, thereby transforming the cubic shape into a rectangular parallelepiped shape. In FIGS. 12A and 12B, a user may hold the two quadrilaterals ABCD and EFGH with both hands and then spread them to increase the distance between the quadrilaterals ABCD and EFGH in the X-axis direction, thereby transforming the cubic shape into a rectangular parallelepiped shape with the sides AE, BF, CG, and DH increased in the X-axis direction. The aerial image may be enlarged in the Y-axis direction or the Z-axis direction.

Figure 13A:
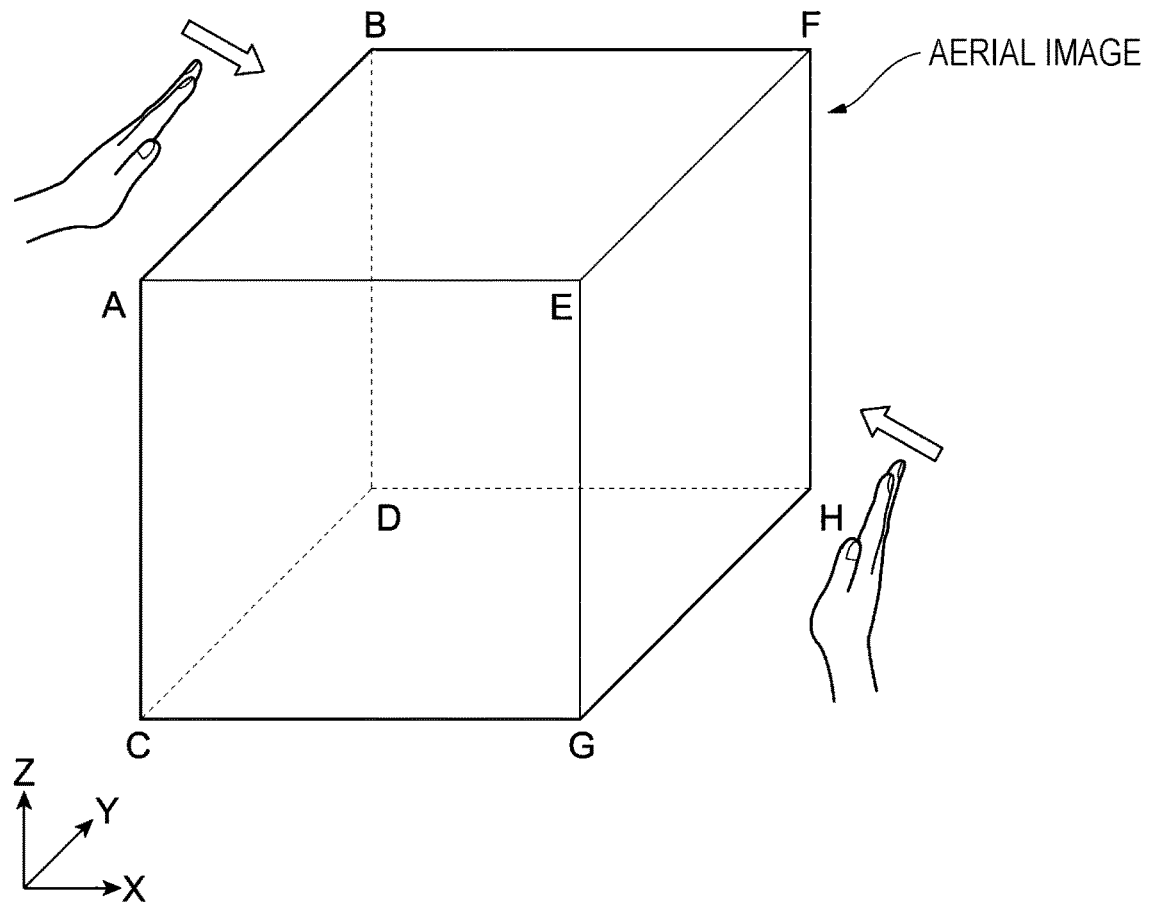
FIGS. 13A and 13B illustrate an example in which a cubic aerial image is reduced with a gesture.
Figure 13B:
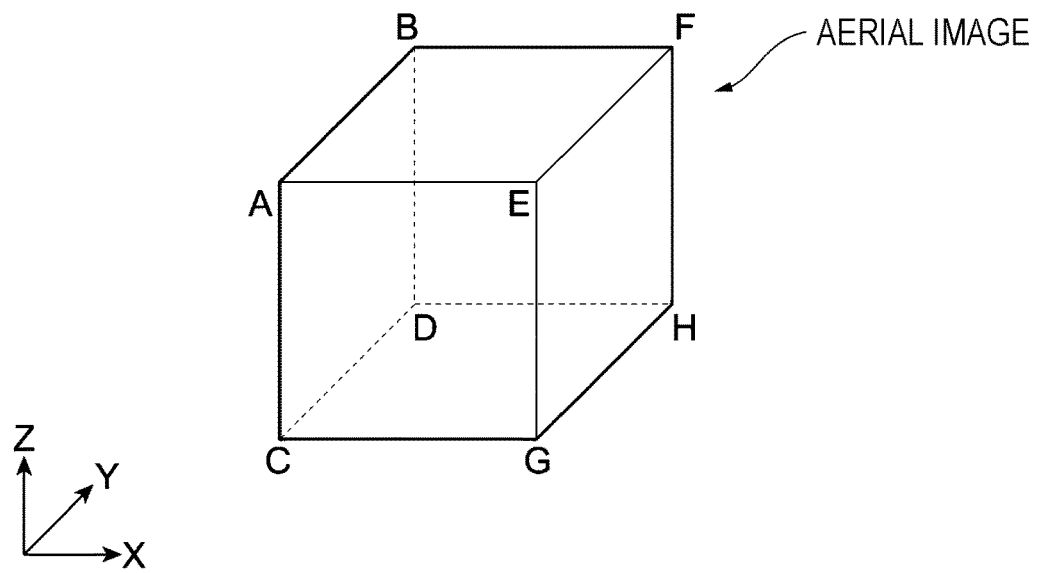

FIGS. 13A and 13B illustrate an example in which a cubic aerial image is reduced with a gesture. FIG. 13A illustrates a gesture of moving both hands close to each other diagonally with respect to the aerial image. FIG. 13B illustrates the resulting aerial image. A cubic aerial image may be reduced in a specific direction without necessarily maintaining the cubic shape. For example, a user may hold a pair of opposing quadrilaterals of a cubic aerial image with both hands and then moves them close to each other to decrease the distance between the quadrilaterals, thereby transforming the cubic shape into a rectangular parallelepiped shape. In FIGS. 13A and 13B, a user may hold the two quadrilaterals ABCD and EFGH with both hands and then move them close to each other to decrease the distance between the quadrilaterals ABCD and EFGH in the X-axis direction, thereby transforming the cubic shape into a rectangular parallelepiped shape with the sides AE, BF, CG, and DH decreased in the X-axis direction. The aerial image may be reduced in the Y-axis direction or the Z-axis direction.

Selecting of a document using an aerial image formed in the air will be discussed below.

Figure 14:
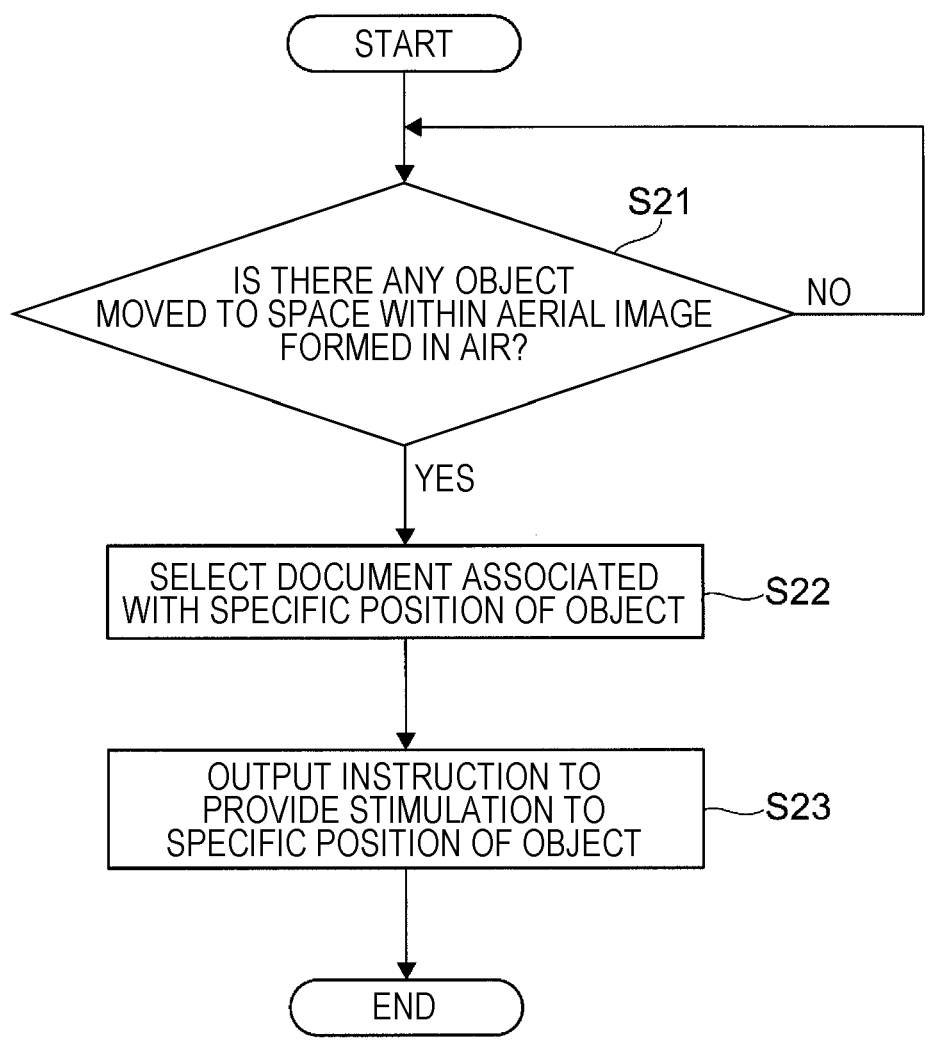
FIG. 14 is a flowchart illustrating another example of processing executed by the processor according to the first exemplary embodiment.

FIG. 14 is a flowchart illustrating another example of processing executed by the processor 21 (see FIG. 1) in the first exemplary embodiment. Processing shown in FIG. 14 is processing to be executed when the selection of a document is detected.

In step S21, the processor 21 judges whether there is any object moved to a space within an aerial image formed in the air. At this stage, the shape of the aerial image has already been changed by one of the above-described gestures.

While the result of step S21 is NO, the processor 21 repeatedly executes step S21.

If it is judged in step S21 that such an object is found, the processor 21 proceeds to step S22 to select a document associated with a specific position of the object. In the first exemplary embodiment, the specific position of the object is a position of a fingertip or the tip of a pointing stick. The specific position is identified as a position in the coordinate system in a real space. The specific position of the object is converted from the position of the coordinate system in the real space into that in a data space. Then, the document associated with the specific position of the coordinate system in the data space is selected.

In step S23, the processor 21 outputs an instruction to provide stimulation to the specific position of the object to the ultrasonic tactile interface device 40.

(Specific Examples of Operation Using Aerial Image)

Specific examples of the operation using an aerial image will be described below. In the following examples, the operation performed on an aerial image with which search results are associated will be described. In the following examples, the search results are those obtained by conducting a search on the Internet or a database by using a computer or another information terminal (not shown).

To conduct a search, a screen displaying a field for inputting a keyword for a search and a field for selecting a search method, for example, is presented to a user so that the user can specify search conditions. Examples of the search method are logical AND that is likely to display documents including all keywords at the top of the search results, logical OR that combines the results of searching for documents including at least one of multiple keywords, exact match that searches for documents including all keywords as one keyword, and negative match that excludes a specific keyword from the search results.

When presenting the search results to a user, as an option, a check box "search results are displayed with an aerial image", for example, may be provided so that the user can check the search results mapped on an aerial image. Alternatively, documents found by a search or a list of documents may be displayed on the screen, and then, an aerial image on which the documents are mapped may also be presented to a user.

First Specific Example

FIG. 15 illustrates an example of a data table indicating information concerning documents that satisfy all four search conditions according to a first specific example.

In the example in FIG. 15, the four search conditions are as follows. A search condition #1 is to search for documents including a keyword "multifunction device" or "printer", a search condition #2 is to search for documents including a keyword "consumables" or "parts", a search condition #3 is to search for documents including a keyword "notification", and a search condition #4 is to search for documents including a keyword "replacement time" or "life".

In FIG. 15, document A, document B, and document C are illustrated as the documents that satisfy all the four conditions #1 through #4.

Concerning the total number of characters, the document A has 10000, the document B has 20000, and the document C has 30000.

Regarding the document A, text that satisfies the condition #1 appears thirty times, text that satisfies the condition #2 appears ten times, text that satisfies the condition #3 appears five times, and text that satisfies the condition #4 appears twenty times.

The appearance ratio of the four conditions (condition #1: condition #2: condition #3: condition #4) is 6:2:1:4. The ratio of the total number of appearance times to the total number of characters is 0.0065. The overall relevance degree is 4.5.

Regarding the document B, text that satisfies the condition #1 appears ten times, text that satisfies the condition #2 appears forty times, text that satisfies the condition #3 appears eighty times, and text that satisfies the condition #4 appears sixty times.

The appearance ratio of the conditions (condition #1: condition #2: condition #3: condition #4) is 1:4:8:6. The ratio of the total number of appearance times to the total number of characters is 0.0095. The overall relevance degree is 5.

Regarding the document C, text that satisfies the condition #1 appears six times, text that satisfies the condition #2 appears six times, text that satisfies the condition #3 appears thirty times, and text that satisfies the condition #4 appears three times.

The appearance ratio of the conditions (condition #1: condition #2: condition #3: condition #4) is 2:2:10:1. The ratio of the total number of appearance times to the total number of characters is 0.0015. The overall relevance degree is 1.

Figure 16A:
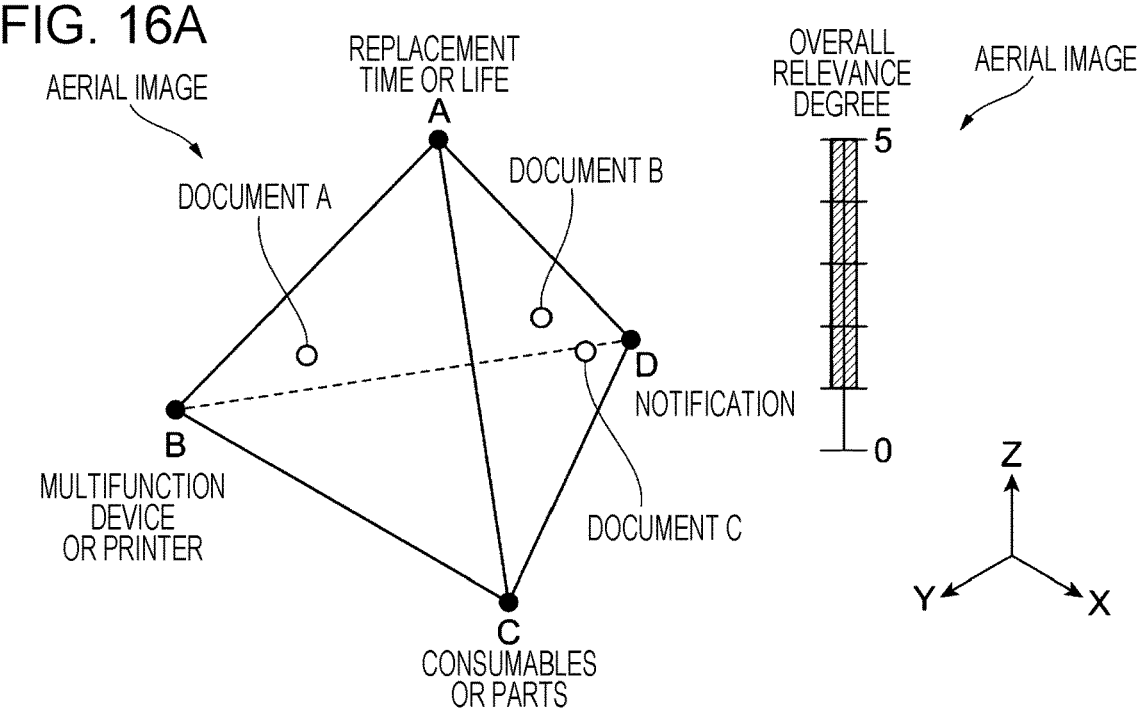
FIGS. 16A, 16B, and 16C illustrate examples in which documents satisfying all the four search conditions are mapped on aerial images.
Figure 16B:
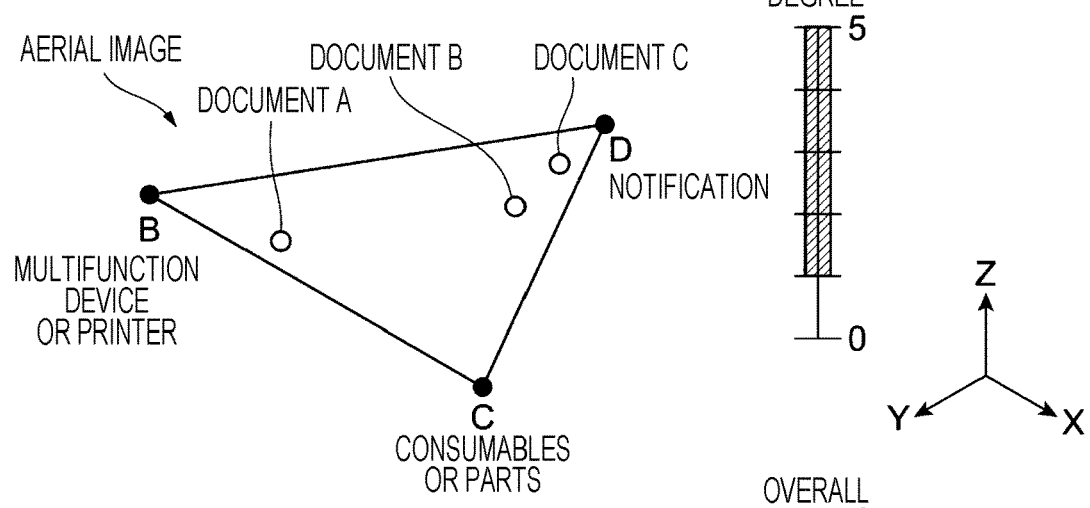
Figure 16C:
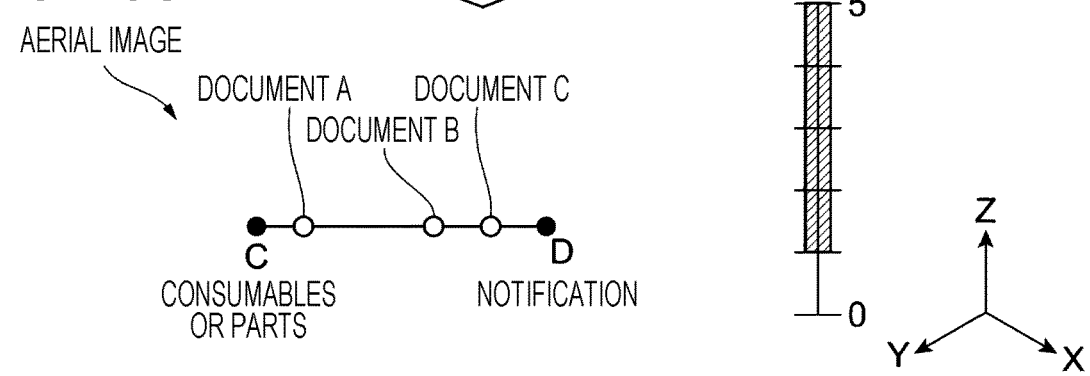

FIGS. 16A, 16B, and 16C illustrate examples in which the documents satisfying all the four search conditions are mapped on aerial images. FIG. 16A illustrates an example in which the documents satisfying the search conditions are mapped on a regular triangular pyramid as an aerial image. FIG. 16B illustrates an example in which the documents satisfying the search conditions are mapped on a regular triangle as an aerial image as a result of reducing the characteristics of the documents to three by a gesture of a user. FIG. 16C illustrates an example in which the documents satisfying the search conditions are mapped on a line segment as an aerial image as a result of reducing the characteristics of the documents to two by a gesture of a user.

The index for the overall relevance degree is also presented as an aerial image. This makes it easier to check the overall relevance degree of the documents mapped on an aerial image. In the examples in FIGS. 16A through 16C, the number of documents presented to a user with an aerial image is adjusted by using the overall relevance degree, thereby making it easier for the user to check the documents within the aerial image.

Restricting the number of documents using the index for the overall relevance degree can also contribute to restricting the overall relevance degrees to a certain overall relevance degree, as well as easily checking the documents in the aerial image. For example, the overall relevance degree of the documents mapped on an aerial image may be limited to "2" and "3".

In the examples in FIGS. 16A through 16C, icons are presented in the aerial image to indicate the positions of the documents. In this example, the icons are dots, but different icons may also be used. The colors of the icons may be changed in accordance with the overall relevance degree. For example, an icon for a document with a higher overall relevance degree may be in red, while an icon for a document with a lower overall relevance degree may be in blue. Alternatively, a specific color may be assigned to a specific overall relevance degree regardless of whether the overall relevance degree is high or low.

The overall relevance degree may be indicated by the strength of tactile stimulation.

In the example in FIG. 16A, the search conditions #1 through #4 are associated with the vertices A through D of the regular triangular pyramid. More specifically, the vertex A corresponds to the condition #4, the vertex B corresponds to the condition #1, the vertex C corresponds to the condition #2, and the vertex D corresponds to the condition #3.

In the examples in FIGS. 16A through 16C, documents having the overall relevance degree of 1 to 5 are mapped on the aerial image. The icons indicating the positions of the documents A, B, and C shown in FIG. 15 are mapped on the aerial image.

Documents to be mapped on an aerial image may be changed by operating the index for the overall relevance degree with a finger or using an input screen (not shown), for example.

The aerial image shown in FIG. 16B is an image transformed from that shown in FIG. 16A by a gesture of a user. The documents A, B, and C are remapped within a plane of a regular triangle defined by the vertices B, C, and D. As a result of reducing the number of search conditions for documents to three, the relationship between the documents and the three conditions can be identified more easily.

The aerial image shown in FIG. 16C is an image transformed from that shown in FIG. 16A or FIG. 16B by a gesture of a user. The documents A, B, and C are remapped on a line segment defined by the vertices C and D. As a result of reducing the number of search conditions for documents to two, the relationship between the documents and the two conditions can be identified more easily.

Transforming of an aerial image and remapping of the documents A, B, and C are executed by the processor 21 in a data space.

In the examples in FIGS. 16A through 16C, the icons in the aerial image each represent an individual document. Alternatively, an icon may represent a group of documents. In this case, the size of an icon may reflect the number of documents represented by the icon. For example, the size of an icon representing a larger number of documents may be larger than the size of an icon representing a smaller number of documents. Other features of an icon such as color, brightness level, and blinking pattern may be used to reflect the number of documents represented by an icon. An icon representing a larger number of documents than an icon representing a smaller number of documents can be emphasized by a different shape, a different color, increased brightness or darkness, with blinking or with a faster blinking speed, and more. As discussed above, the level of tactile stimulation provided to a fingertip at the position of an icon may be changed in accordance with the number of documents.

Second Specific Example

FIG. 17 illustrates another example of a data table indicating information concerning documents that satisfy all three search conditions according to a second specific example.

In the example in FIG. 17, the three search conditions are as follows. A search condition #1 is to search for documents including a keyword "multifunction device" or "printer", a search condition #2 is to search for documents including a keyword "consumables" or "parts", and a search condition #3 is to search for documents including a keyword "notification". In the second specific example, the number of search conditions are three.

In FIG. 17, as well as in FIG. 15, document A, document B, and document C are illustrated as the documents that satisfy all the three conditions #1 through #3.

Concerning the total number of characters, the document A has 10000, the document B has 20000, and the document C has 30000.

Regarding the document A, text that satisfies the condition #1 appears thirty times, text that satisfies the condition #2 appears ten times, and text that satisfies the condition #3 appears five times.

In the example in FIG. 17, the ratio of the number of appearance times to the total number of characters is found for each condition. Regarding the document A, the ratio of the number of appearance times for the condition #1 is 0.003, that for the condition #2 is 0.001, and that for the condition #3 is 0.0005. The total number of appearance times for all the keywords is 45, and the ratio of the total number of appearance times to the total number of characters is 0.0045.

Regarding the document B, text that satisfies the condition #1 appears ten times, text that satisfies the condition #2 appears forty times, and text that satisfies the condition #3 appears eighty times.

Regarding the document B, the ratio of the number of appearance times for the condition #1 is 0.0005, that for the condition #2 is 0.002, and that for the condition #3 is 0.004. The total number of appearance times for all the keywords is 130, and the ratio of the total number of appearance times to the total number of characters is 0.0065.

Regarding the document C, text that satisfies the condition #1 appears six times, text that satisfies the condition #2 appears six times, and text that satisfies the condition #3 appears thirty times.

Regarding the document C, the ratio of the number of appearance times for the condition #1 is 0.0002, that for the condition #2 is 0.0002, and that for the condition #3 is 0.001. The total number of appearance times for all the keywords is 42, and the ratio of the total number of appearance times to the total number of characters is 0.0014.

Figure 18:
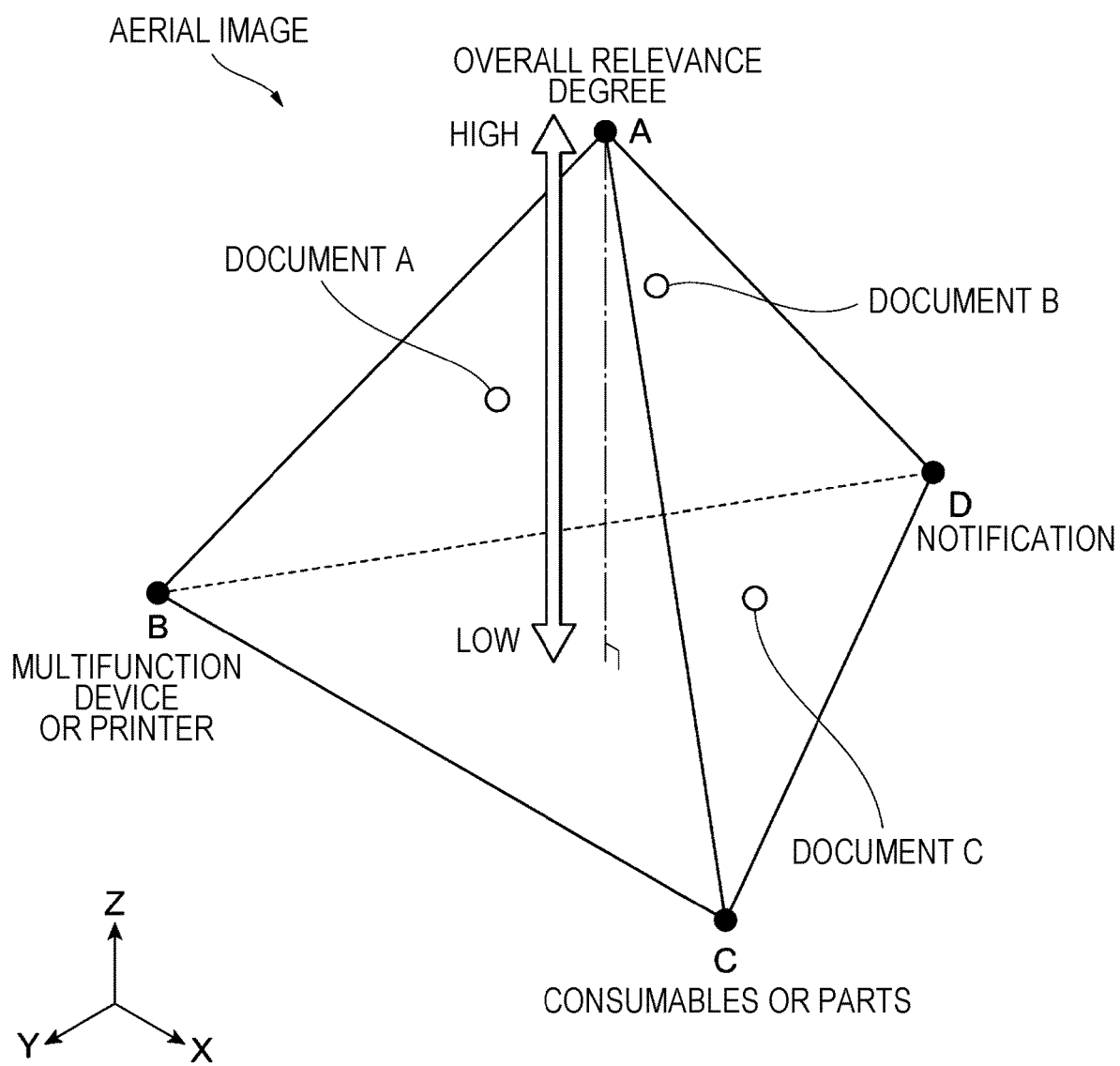
FIG. 18 illustrates an example in which documents satisfying all the three search conditions are mapped on an aerial image.

FIG. 18 illustrates an example in which the documents satisfying all the three search conditions are mapped on an aerial image. As in FIG. 16A, in FIG. 18, a regular triangular pyramid is used as an aerial image.

In the example in FIG. 18, the vertex A serves as the apex of the regular triangular pyramid, and the triangle BCD defined by the vertices B, C, and D serves as the bottom surface of the regular triangular pyramid. The position in the height direction of the regular triangular pyramid represents the overall relevance degree. The overall relevance degree represents the rate of the appearance of all the keywords in the document. The vertex B corresponds to the condition #1, the vertex C corresponds to the condition #2, and the vertex D corresponds to the condition #3.

As the height of the document mapped on the regular triangular pyramid is closer to the vertex A, the overall relevance degree is higher. As the height of the document mapped on the regular triangular pyramid is closer to the triangle BCD, which is the bottom surface, the overall relevance degree is lower.

In the example in FIG. 18, the document B having the highest rate of the appearance of all the keywords is located at the highest position, the document A is located at the second highest position, and the document C is located at the lowest position.

In the example in FIG. 18, an aerial image of the index for the overall relevance degree is not formed in the air. In this case, to reduce the number of documents to be mapped, part of the aerial image is cut by one of the gestures discussed with reference to FIGS. 9A through 11B.

In the above-described first specific example, to reduce the number of conditions, which are the characteristics of documents defining the aerial image, the gestures discussed with reference to FIGS. 6A through 8C are suitably used. In the second specific example, a different approach is taken to reduce the number of conditions.

Figure 19:
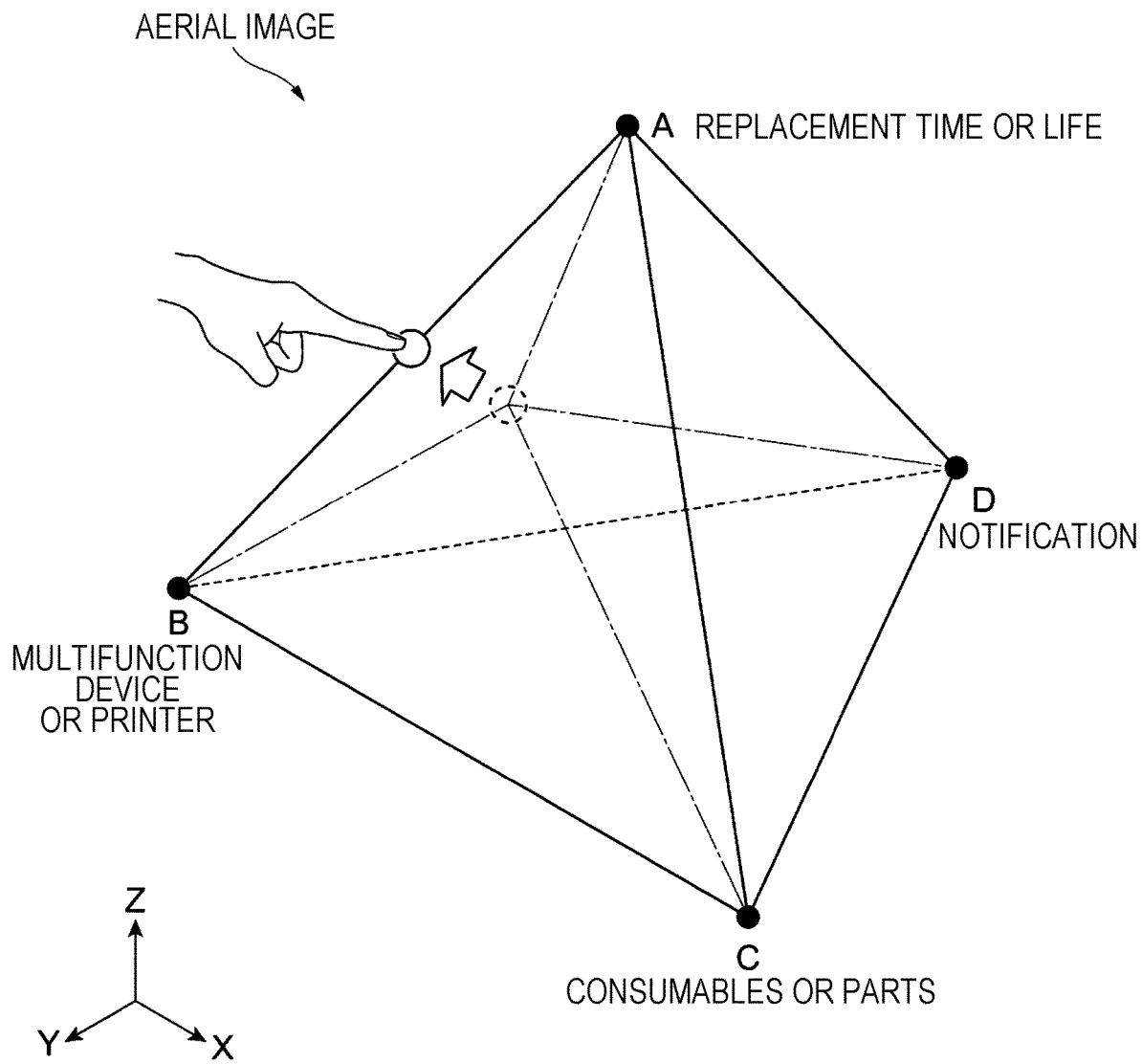
FIG. 19 illustrates an example of a gesture used to reduce the number of conditions to two or to increase the weight applied to two conditions corresponding to a location at which a pointer is shifted.

FIG. 19 illustrates an example of a gesture used to reduce the number of conditions to two or to increase the weight applied to two conditions corresponding to a location at which a pointer is shifted.

In the example in FIG. 19, a pointer presented to change conditions is shifted to a line segment connecting the vertex A and the vertex B with a fingertip. In this case, documents are remapped from the viewpoints of the condition including a keyword "replacement time" or "life" and the condition #1.

When the pointer is shifted to another line segment, the documents are remapped from the viewpoints of the conditions corresponding to the two vertices defining this line segment.

In the second specific example, the weighting ratio of the conditions is varied in accordance with the distance from the position of the shifted pointer to one vertex and that to the other vertex of a line segment.

In the example in FIG. 19, the shifted pointer is located around the center of the line segment connecting the vertex A and the vertex B. The weights applied to the two conditions are thus substantially equal to each other. If the shifted pointer is closer to the vertex B, the weight applied to the condition corresponding to the vertex B is larger than that corresponding to the vertex A, and the position of the document on the line segment is recalculated.

The pointer is presented when an operation performed on an input device (not shown) or a predetermined gesture is detected.

When a fingertip overlaps the pointer for a predetermined time or longer, for example, the selection of the pointer is detected. While a fingertip is overlapping the pointer, an operation for setting the selection of the pointer with a physical key (not shown) or sound may be performed. When the moving speed of a fingertip reaches a predetermined speed or lower, it may be assumed that the pointer is selected. A gesture of holding the pointer may also be utilized for selecting the pointer. The above-described operations may be used, not only for selecting the pointer, but also for inputting the position of a fingertip.

Figure 20:
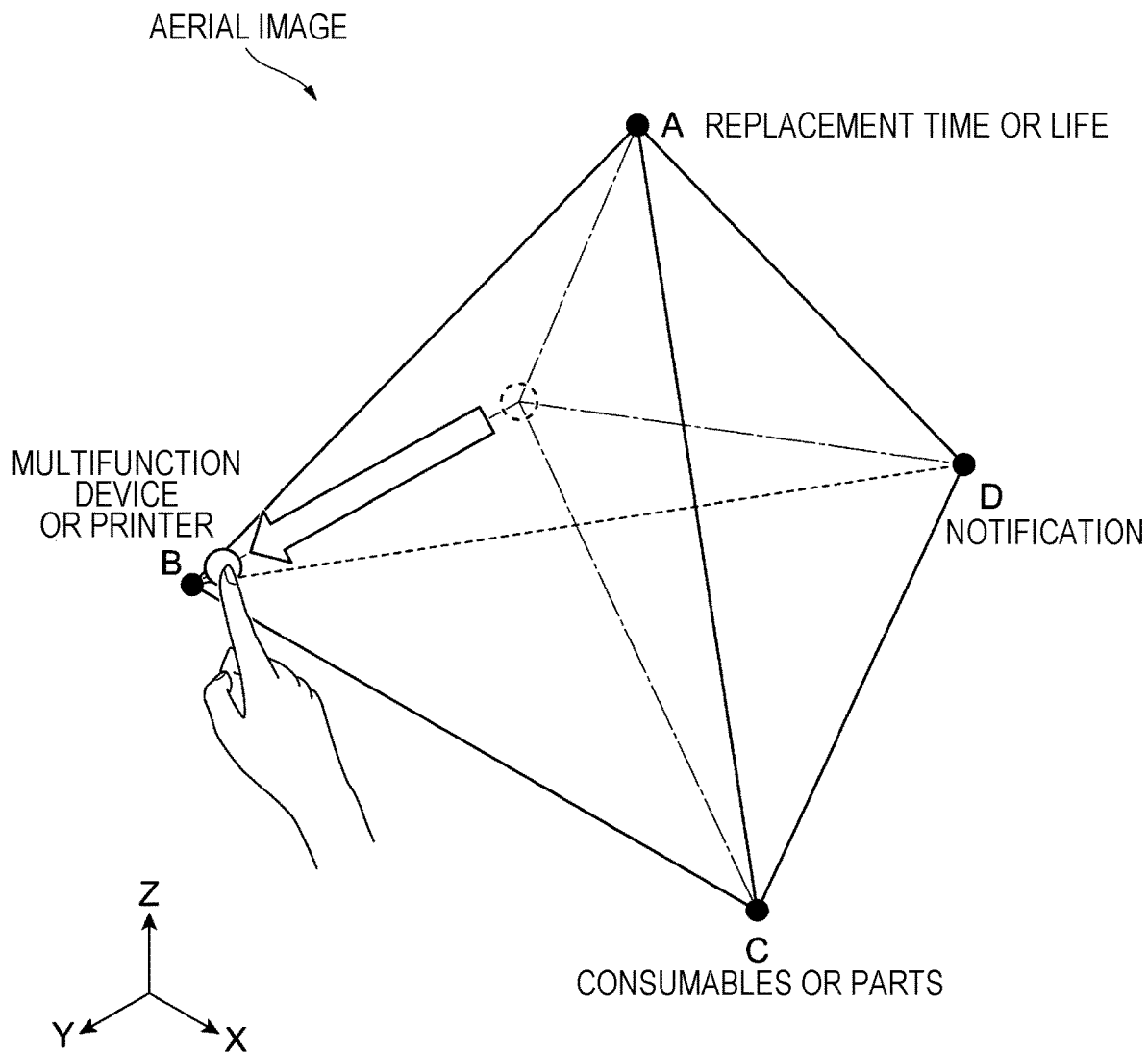
FIG. 20 illustrates an example of a gesture used to reduce the number of conditions to one or to increase the weight applied to one condition corresponding to a location at which a pointer is shifted.

FIG. 20 illustrates an example of a gesture used to reduce the number of conditions to one or to increase the weight applied to one condition corresponding to a location at which a pointer is shifted.

In the example in FIG. 20, a pointer presented to change conditions is shifted toward the vertex B with a fingertip. In this case, documents are remapped from the viewpoint of the condition #1.

When the pointer is shifted toward another vertex, the documents are remapped from the viewpoint of the condition corresponding to this vertex.

In the second specific example, the weighting ratio of the condition is varied in accordance with the distance from the position of the shifted pointer to the corresponding vertex.

In the example in FIG. 20, the shifted pointer is located adjacent to the vertex B. The weight is thus applied substantially to the condition #1, and the documents are remapped.

Figure 21:
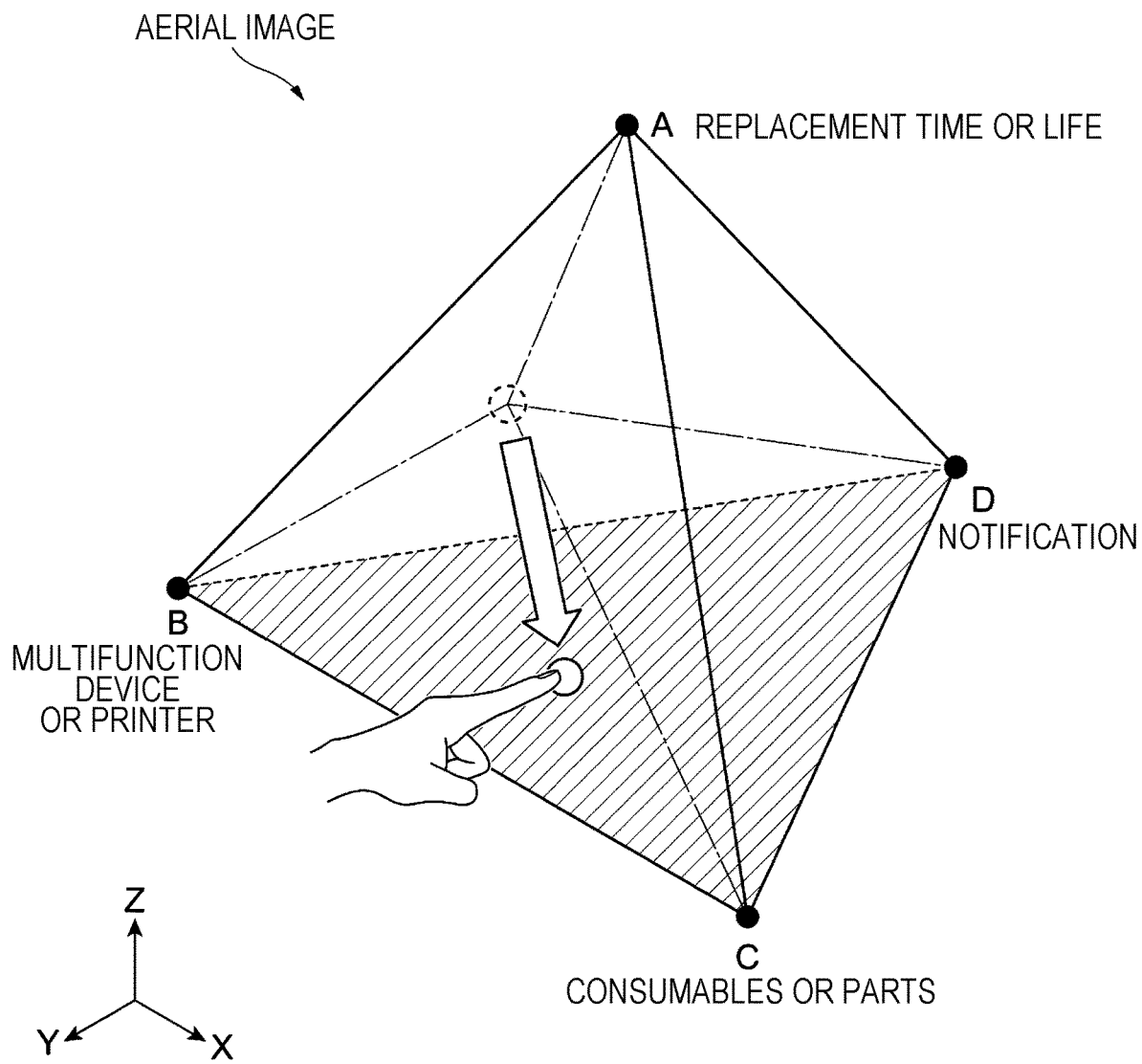
FIG. 21 illustrates an example of a gesture used to reduce the number of conditions to three or to increase the weights applied to three conditions corresponding to a location at which the pointer is shifted.

FIG. 21 illustrates an example of a gesture used to reduce the number of conditions to three or to increase the weights applied to three conditions corresponding to a location at which the pointer is shifted.

In the example in FIG. 21, a pointer presented to change conditions is shifted toward the bottom surface defined by the vertices B, C, D with a fingertip. In FIG. 21, the bottom surface is indicated by the hatched portion.

In this case, documents are remapped from the viewpoints of the conditions #1, #2, and #3.

When the pointer is shifted toward another surface, the documents are remapped from the viewpoints of the conditions corresponding to this surface.

In the second specific example, the weighting ratio of the conditions is varied in accordance with the distance from the position of the shifted pointer to each of the vertices defining the surface to which the pointer is shifted.

In the example in FIG. 21, the shifted pointer is located close to the vertices B and C and is separated from the vertex D. The weights are thus applied to the conditions #1 and #2, and the documents are remapped.

Third Specific Example

Figure 22:
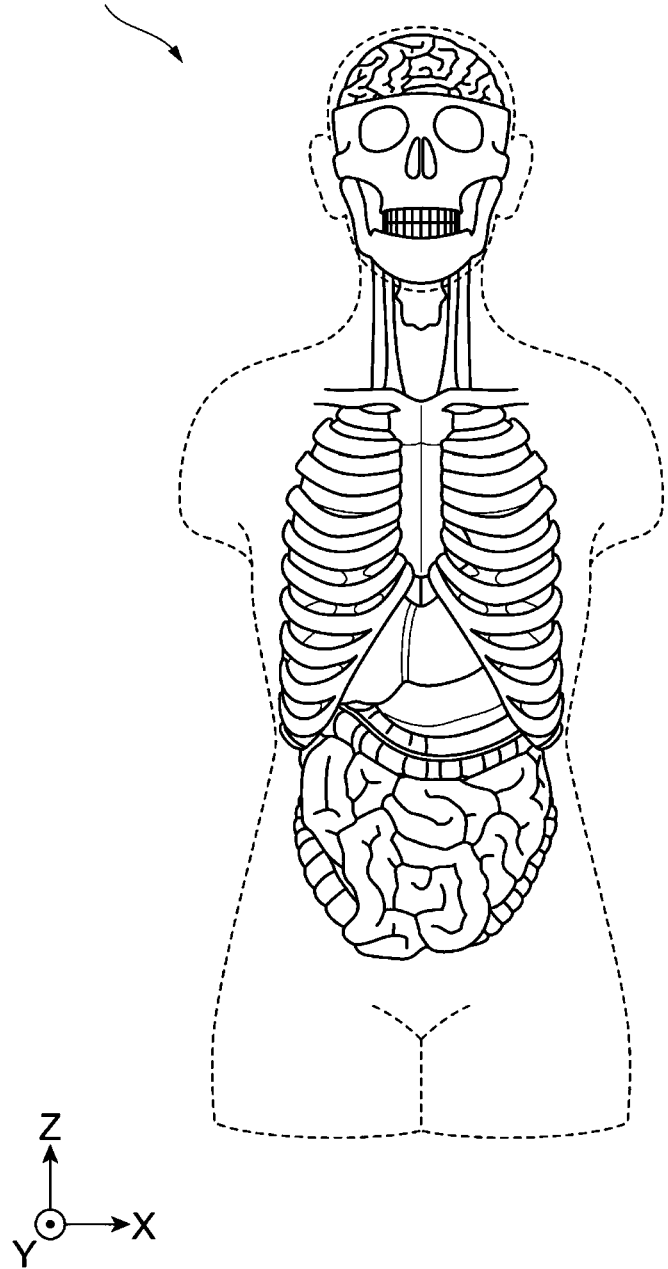
FIG. 22 illustrates an example in which an aerial image is utilized in the medical field.

FIG. 22 illustrates an example in which an aerial image is utilized in the medical field according to a third specific example. In the example in FIG. 22, organs, such as the brain, bones, lungs, stomach, small intestine, and large intestine, are represented in color, while the skin is represented at high transparency.

In the example in FIG. 22, a user can select a part of the body by organ. A user may alternatively select a portion of an organ, such as the inlet of the small intestine or the exist of the small intestine.

In FIG. 22, an image of a medical case is mapped on a standard human model. An image of a medical case corresponds to the above-described document. If an image of a medical case is recognized as an image concerning a small intestine by the image recognition technology, the processor (see FIG. 1) appends the attribute "small intestine" to this image and maps the image at the position of the small intestine of the human model.

To inform a user that the image is mapped on the human model, the small intestine in the aerial image may be caused to blink or be indicated in a different color from the other organs.

Tactile stimulation may be provided in accordance with the organ. For example, when a user touches the small intestine with a hand, tactile stimulation may be provided to the user as if the user were touching the small intestine with a hand.

Although the backbone is not seen from the angle in FIG. 22, an image of a backbone is also mapped at the position of the backbone.

When a user makes a gesture of rotating the human model, the orientation of the human model is changed to enable the user to access the parts on the back side as well as those on the front side.

The transmittance of the organs in the aerial image may be adjusted so that a user can see through the parts on the front side to observe the parts on the back side. By utilizing the characteristics of an aerial image, a user may pass through the organs on the front side to access the parts on the back side.

However, if multiple parts of the body overlap each other, it may be difficult to observe a desired part. An aerial image may be formed so that the parts on the back side are not transparent. Even when the parts on the back side are not seen from the front side, it is still possible to pass through the parts on the front side to access the parts on the back side.

Additionally, by using the above-described gestures, a user may be able to dissect the human model or extract a specific part. For example, in accordance with a gesture of removing the skin, the shape of the human model may be changed. In accordance with a gesture of extracting an organ, the shape of the human model may be changed so that a specific organ or a part can be extracted. Unlike a display, using an aerial image makes it possible to represent an image of an organ, for example, three-dimensionally in the air. Hence, an aerial image can be transformed in accordance with the motion of a user.

Fourth Specific Example

FIG. 23 illustrates an example in which an aerial image is utilized in the architectural field or in the housing industry according to a fourth specific example. In the example in FIG. 23, a fictitious show house is represented as an aerial image.

More specifically, a kitchen in the fictitious show house is represented as an aerial image. In the aerial image shown in FIG. 23, household appliances, such as a microwave and a rice streamer, are disposed. In this example, in a folder of the household appliances, data indicating instruction manuals for the household appliances is stored. Items of information concerning the instruction manuals are associated with the positions of the individual household appliances, such as the microwave and the rice steamer, in the aerial image. In this example, the instruction manuals correspond to the documents.

In the example in FIG. 23, the processor 21 extracts items of information concerning the household appliances from the individual instruction manuals and associates the extracted items of information with spaces within these household appliances in the air. For example, a data file of the instruction manual of the microwave is mapped at the position of the microwave in the aerial image. When a user inserts a hand into the image of the microwave, it can access the instruction manual concerning the microwave. For example, an image of the instruction manual of the microwave is formed in the air. The user makes a gesture for the image of the instruction manual to check the content of a desired page.

The user may also be able to make a gesture of removing the microwave in the air to the outside the fictitious show house. In this case, the user can also move the instruction manual of the microwave associated with a certain position of the aerial image from the current storage location to another location, such as a trash folder.

Second Exemplary Embodiment

In a second exemplary embodiment, another method for associating documents with an aerial image will be described.

In the first exemplary embodiment, the positions of an aerial image with which documents are associated are determined based on the aerial image in a data space. Alternatively, the positions of an area image with which documents are associated may be determined irrelevantly to the position of an aerial image in a data space.

An example of processing executed in the second exemplary embodiment will be described below with reference to FIGS. 24 through 26. The other configurations, such as the configuration of the information processing system 1 (see FIG. 1), are similar to those of the first exemplary embodiment.

Figure 24:
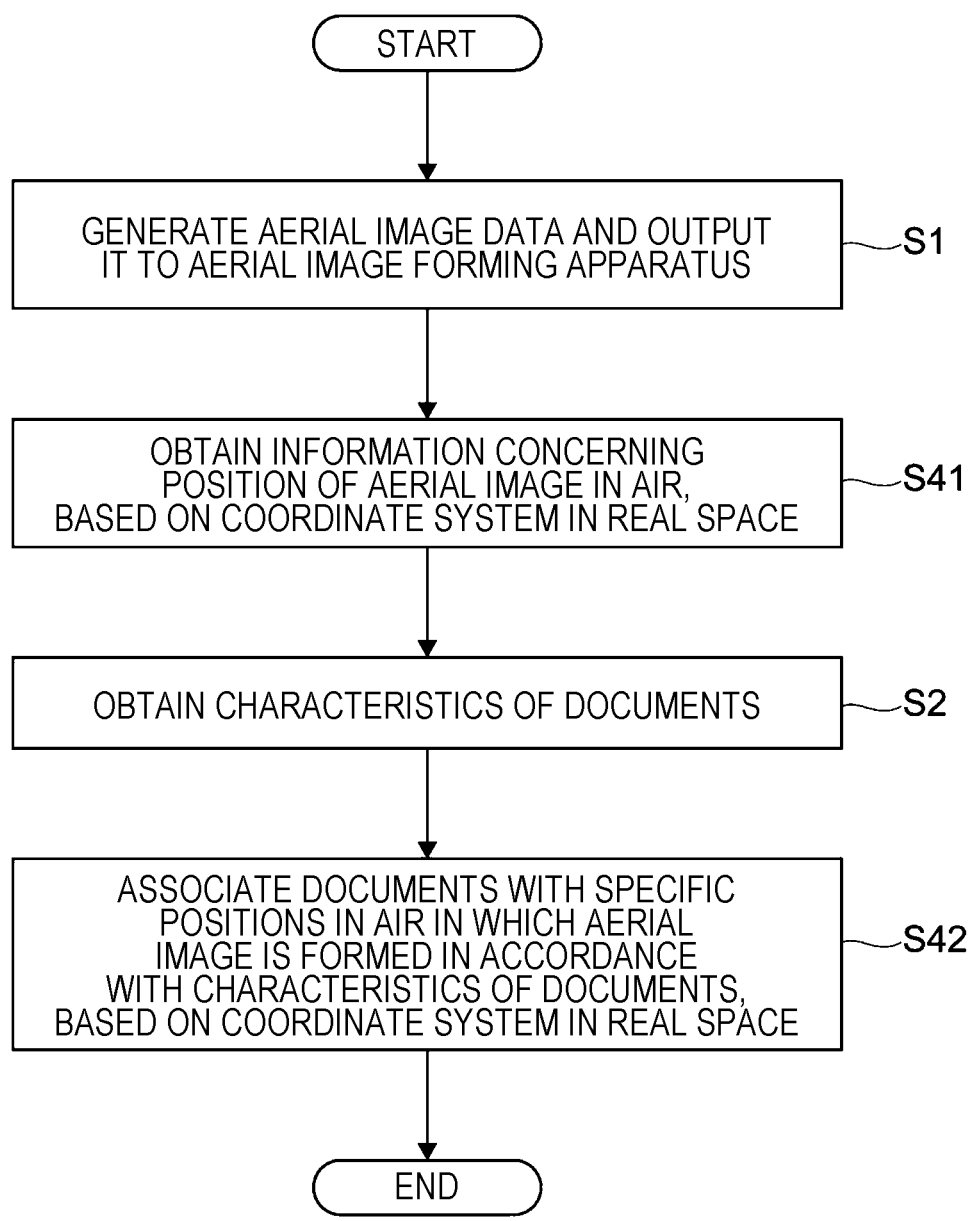
FIG. 24 is a flowchart illustrating an example of processing executed by the processor according to a second exemplary embodiment.

FIG. 24 is a flowchart illustrating an example of processing executed by the processor 21 (see FIG. 1) in the second exemplary embodiment. Operations similar to those in FIG. 4 are designated by like step numbers.

In step S1, the processor 21 generates data concerning an aerial image to be formed by the aerial image forming apparatus 10 (see FIG. 1) and outputs the data to the aerial image forming apparatus 10. That is, the processor 21 outputs aerial image data to the aerial image forming apparatus 10. Upon receiving the aerial image data, the aerial image forming apparatus 10 forms an aerial image in the air based on the aerial image data. Step S1 is the same as that in the first exemplary embodiment.

Then, in step S41, the processor 41 obtains information concerning the position of the aerial image in the air. That is, the processor 21 obtains the position of the aerial image based on the coordinate system in a real space.

In the second exemplary embodiment, as the position of the aerial image based on the coordinate system in a real space, the coordinates defined by the coordinate system used by the aerial image forming apparatus 10 or that by the sensor 30 (see FIG. 1) are used.

Then, in step S2, the processor 21 obtains characteristics of subject documents.

In step S42, the processor 21 associates the documents with the specific positions in the air in which the aerial image is formed, in accordance with the characteristics of the documents. In the second exemplary embodiment, the position of the aerial image is identified based on the coordinate system in the real space. The processor 21 thus associates the documents with the positions in the air based on the coordinate system in the real space.

The coordinate system used for associating the documents in the second exemplary embodiment is different from that in the first exemplary embodiment. However, the positions of the documents in the real space are the same as those in the first exemplary embodiment.

Figure 25:
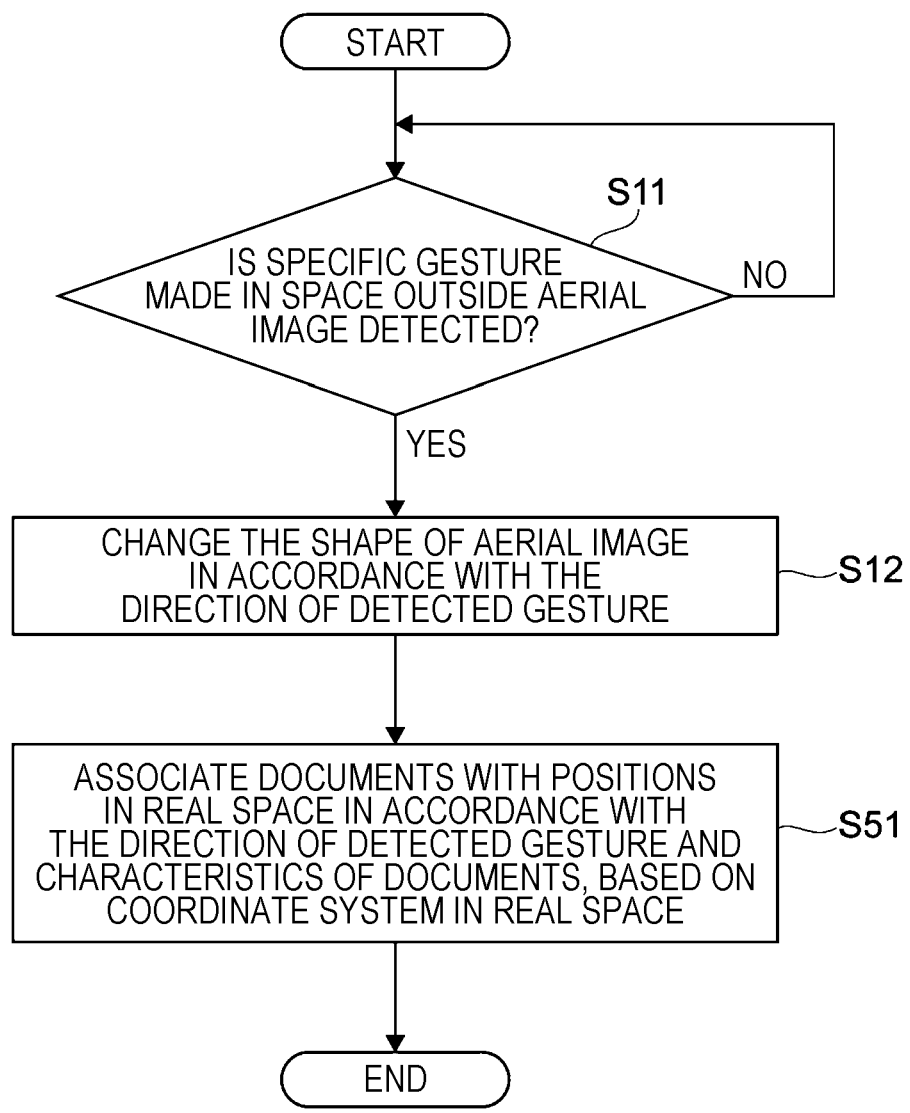
FIG. 25 is a flowchart illustrating another example of processing executed by the processor according to the second exemplary embodiment.

FIG. 25 is a flowchart illustrating another example of processing executed by the processor 21 in the second exemplary embodiment. Processing shown in FIG. 25 is processing to be executed when an instruction to change the shape of an aerial image is received. Operations similar to those in FIG. 5 are designated by like step numbers.

In step S11, the processor 21 judges whether a specific gesture made in a space outside the aerial image is detected. Step S11 is the same as that in the first exemplary embodiment.

While the result of step S11 is NO, the processor 21 repeatedly executes step S11.

If the result of step S11 is YES, the processor 21 proceeds to step S12 to change the shape of the aerial image in accordance with the direction of the detected gesture. Step S12 is also the same as that in the first exemplary embodiment.

Then, in step S51, the processor 21 associates the documents with the positions in the real space in accordance with the direction of the detected gesture and the characteristics of the documents. More specifically, the processor 21 excludes the characteristic corresponding to the direction of the detected gesture and associates the documents with the positions in the real space based on the remaining characteristics. That is, the processor 21 associates the documents with the positions based on the coordinate system in the real space.

Figure 26:
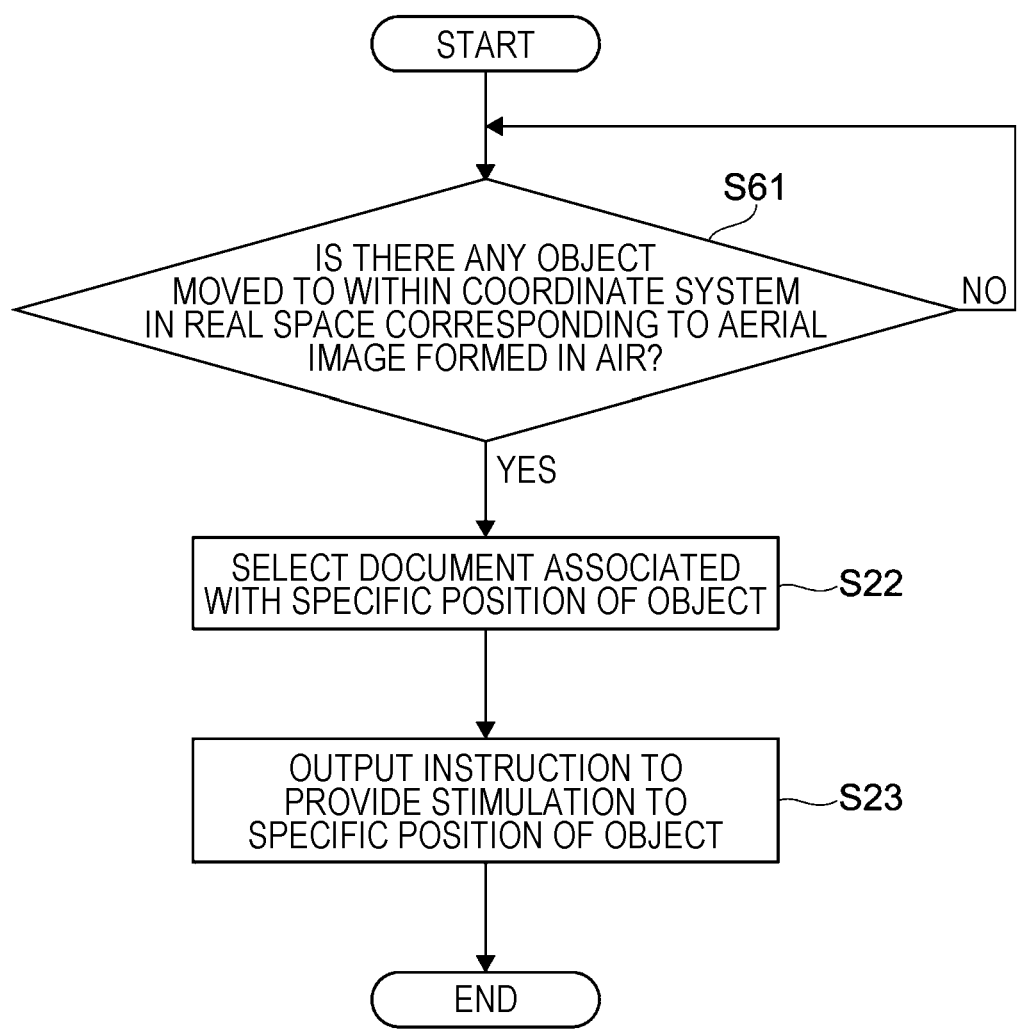
FIG. 26 is a flowchart illustrating another example of processing executed by the processor according to the second exemplary embodiment.

FIG. 26 is a flowchart illustrating another example of processing executed by the processor 21 in the second exemplary embodiment. Processing shown in FIG. 26 is processing to be executed when the selection of a document is detected. Operations similar to those in FIG. 14 are designated by like step numbers.

In step S61, the processor 21 judges whether there is any object moved to within the coordinate system in a real space corresponding to an aerial image formed in the air. At this stage, the shape of the aerial image has already been changed by one of the above-described gestures.

While the result of step S61 is NO, the processor 21 repeatedly executes step S61.

If the result of step S61 is YES, the processor 21 proceeds to step S22 to select a document associated with a specific position of the object. In the second exemplary embodiment, the specific position of the object is a position of a fingertip or the tip of a pointing stick. The specific position is identified as a position in the coordinate system in a real space. In the second exemplary embodiment, the specific position of the object is converted from the position of the coordinate system in the real space into that in a data space. Then, the document associated with the coordinates in the real space is selected.

In step S23, the processor 21 outputs an instruction to provide stimulation to the specific position of the object to the ultrasonic tactile interface device 40.

Other Exemplary Embodiments

The present disclosure has been discussed through illustration of the above-described exemplary embodiments. Various modifications and improvements may be made to the above-described exemplary embodiments.

For example, in the above-described exemplary embodiments, the position of an object, such as a fingertip, with respect to an aerial image is detected by the sensor 30. However, the position of an object with respect to an aerial image may be detected by receiving radio waves emitted from the object. For example, the position of a fingertip wearing a ring which emits a Bluetooth (registered trademark) signal may be detected by a position detector (not shown). The position detector detects the position of the ring based on the principle of triangulation.

In the first and second specific examples of the first exemplary embodiment, the search results are mapped on an aerial image formed in the air. In addition to the search results, the content of a document associated with the coordinates pointed by a fingertip may also be presented as an aerial image, separately from the aerial image for the search results, or be presented on a physical display, such as a liquid crystal display. The second exemplary embodiment may be modified in a similar manner.

In the first exemplary embodiment, the positions of documents, which are search results, mapped on a three-dimensional aerial image are indicated by icons. An indicator, such as an icon or another image, may be formed at a position of a fingertip. In this case, such an indicator may be formed in accordance with the number of documents pointed by a fingertip. Tactile stimulation having a strength corresponding to the number of documents pointed by a fingertip may be provided to the fingertip. If no documents are associated with the position pointed by a fingertip, tactile stimulation may not be provided to the fingertip. The second exemplary embodiment may be modified in a similar manner.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
generate data concerning a three-dimensional image to be formed in air, and
associate a document with a specific position within the three-dimensional image, based on a characteristic of the document, wherein
x, y and z axes of the three-dimensional image each represent a selected characteristic of each of a plurality of documents, and
each of the plurality of documents is associated in order along the x, y and z axes with respect to the selected characteristic represented by the x, y and z axes, respectively.

2. The information processing apparatus according to claim 1, wherein the processor is configured to:
associate the document with the specific position within the three-dimensional image, based on at least three characteristics of the document.

3. The information processing apparatus according to claim 2, wherein the processor is configured to:
transform the three-dimensional image formed in the air into a two-dimensional image; and
associate the document with a position within the two-dimensional image, based on a reduced set of characteristics from the at least three characteristics.

4. The information processing apparatus according to claim 1, wherein the processor is configured to:
in response to detecting an object in the air at a position corresponding to the specific position within the three-dimensional image with which the document is associated, select the document associated with the specific position within the three-dimensional image.

5. The information processing apparatus according to claim 4, wherein the processor is configured to:
upon the selection of the document, output an instruction to provide a stimulus to the object.

6. An information processing apparatus comprising:
a processor configured to:
generate data concerning a three-dimensional image to be formed in air; and
associate a document with a specific position in the air, based on a characteristic of the document, wherein
x, y and z axes of the three-dimensional image each represent a selected characteristic of each of a plurality of documents, and
each of the plurality of documents is associated in order along the x, y and z axes with respect to the selected characteristic represented by the x, y and z axes, respectively.

7. The information processing apparatus according to claim 6, wherein the processor is configured to:
associate the document with the specific position in the air, based on at least three characteristics of the document.

8. The information processing apparatus according to claim 7, wherein the processor is configured to:
in response to a gesture of a user performed in the air, associate the document with a different position in the air, the different position being determined based on a reduced set of characteristics from the at least three characteristics, the reduced set of characteristics being determined by the gesture.

9. The information processing apparatus according to claim 8, wherein the reduced set of characteristics varies depending on a direction of the gesture.

10. The information processing apparatus according to claim 6, wherein the processor is configured to:
in response to detecting an object at the specific position in the air, select the document associated with the specific position.

11. The information processing apparatus according to claim 10, wherein the processor is configured to:
upon the selection of the document, output an instruction to provide a stimulus to the object.

12. An information processing apparatus comprising:
a processor configured to:
generate data concerning a three-dimensional image to be formed in air;
set at least three characteristics as search conditions in accordance with a position of an object that is detected in the air by a sensor; and
map documents satisfying the search conditions onto the three-dimensional image.

13. The information processing apparatus according to claim 12, wherein the processor is configured to:
obtain information concerning a document that satisfies the search conditions.

14. The information processing apparatus according to claim 12, wherein values of the at least three characteristics vary depending on the position of the object that is detected in the air by the sensor.

15. The information processing apparatus according to claim 12, wherein the processor is configured to:
remove at least one characteristic of the at least three characteristics set as the search conditions from the search conditions in accordance with a gesture of a user performed in the air.

16. The information processing apparatus according to claim 15, wherein the at least one characteristic varies depending on a direction of the gesture.

17. The information processing apparatus according to claim 15, wherein the processor is configured to:
  transform the three-dimensional image formed in the air into a two-dimensional image in accordance with the gesture of the user performed in the air.

18. The information processing apparatus according to claim 12, wherein the processor is configured to:
  transform the three-dimensional image formed in the air into a two-dimensional image in accordance with a gesture of a user performed in the air.

19. The information processing apparatus according to claim 12, wherein the processor is configured to:
  enlarge or reduce the three-dimensional image formed in the air in accordance with a gesture of a user performed in the air.

20. The information processing apparatus according to claim 12, wherein the processor is configured to:
  generate data concerning an image of an indicator to be formed in the three-dimensional image, the indicator indicating a position within the three-dimensional image corresponding to the position of the object that is detected in the air by the sensor.

21. The information processing apparatus according to claim 20, wherein a feature of the indicator varies depending on the number of documents that satisfy the search conditions.

22. The information processing apparatus according to claim 12, wherein the processor is configured to:
  in response to one or more documents that satisfy the search conditions being found, output an instruction to provide a stimulus to the object.

23. The information processing apparatus according to claim 22, wherein strength of the stimulus provided to the object increases as the number of the documents that satisfy the search conditions increases.

24. A non-transitory computer readable medium storing a program causing a computer to execute a process, the process comprising:
  generating data concerning a three-dimensional image to be formed in air; and
  associating a document with a position within the three-dimensional image, based on a characteristic of the document, wherein
    x, y and z axes of the three-dimensional image each represent a selected characteristic of each of a plurality of documents, and
    each of the plurality of documents is associated in order along the x, y and z axes with respect to the selected characteristic represented by the x, y and z axes, respectively.

25. A non-transitory computer readable medium storing a program causing a computer to execute a process, the process comprising:
  generating data concerning a three-dimensional image to be formed in air; and
  associating a document with a specific position in the air, based on a characteristic of the document, wherein
    x, y and z axes of the three-dimensional image each represent a selected characteristic of each of a plurality of documents, and
    each of the plurality of documents is associated in order along the x, y and z axes with respect to the selected characteristic represented by the x, y and z axes, respectively.

26. A non-transitory computer readable medium storing a program causing a computer to execute a process, the process comprising:
  generating data concerning a three-dimensional image to be formed in air;
  setting at least three characteristics as search conditions in accordance with a position of an object that is detected in the air by a sensor; and
  mapping documents satisfying the search conditions onto the three-dimensional image.

* * * * *